(12) United States Patent
Tietz et al.

(10) Patent No.: US 9,763,146 B2
(45) Date of Patent: Sep. 12, 2017

(54) COMMUNICATION SYSTEM

(71) Applicant: NEC Corporation, Minato-ku, Tokyo (JP)

(72) Inventors: Robert Tietz, Horsham (GB); Robert Paterson, Guildford (GB); Jonathan Lewis, Guildford (GB); Vivek Sharma, London (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/414,493

(22) PCT Filed: Jun. 27, 2013

(86) PCT No.: PCT/JP2013/068310
§ 371 (c)(1),
(2) Date: Jan. 13, 2015

(87) PCT Pub. No.: WO2014/010493
PCT Pub. Date: Jan. 16, 2014

(65) Prior Publication Data
US 2015/0195757 A1    Jul. 9, 2015

(30) Foreign Application Priority Data

Jul. 13, 2012 (GB) .................................. 1212537.3

(51) Int. Cl.
| H04W 36/00 | (2009.01) |
| H04B 7/155 | (2006.01) |
| H04W 36/32 | (2009.01) |
| H04W 84/00 | (2009.01) |

(52) U.S. Cl.
CPC ........ H04W 36/0061 (2013.01); H04B 7/155 (2013.01); H04W 36/0094 (2013.01); H04W 36/32 (2013.01); H04W 84/005 (2013.01)

(58) Field of Classification Search
CPC ............. H04W 36/0061; H04W 36/32; H04W 36/0094; H04W 36/08; H04W 88/04;
(Continued)

(56) References Cited

U.S. PATENT DOCUMENTS

2013/0089022 A1* 4/2013 Lu .......................... H04W 36/08
370/315
2013/0260760 A1* 10/2013 Pan ........................ H04W 36/32
455/436
(Continued)

FOREIGN PATENT DOCUMENTS

| CN | 102098723 A | 6/2011 |
| EP | 2296403 A1 | 3/2011 |

(Continued)

OTHER PUBLICATIONS

3rd Generation Partnership Project, "New Study Item Proposal: Mobile Relay for E-UTRA", 3GPP TSG Ran#53, Sep. 2011 at Fukuoka, Japan.

(Continued)

*Primary Examiner* — Hirdepal Singh

(57) ABSTRACT

A system is disclosed in which a base station initiates a handover of a mobile relay node associated with the base station. The base station obtains information that identifies at least one further base station, and that indicates that the at least one further base station is capable of providing donor services to the mobile relay node. When the base station determines that the mobile relay node requires handover, it selects, from at least one cell of the at least one further base station identified by the obtained information, a target cell for handover of the mobile relay node, and performs handover of the mobile relay node to the selected target cell.

13 Claims, 21 Drawing Sheets

(58) Field of Classification Search
CPC ............... H04W 36/0005; H04B 7/155; H04B 7/15507
USPC .......................................................... 455/438
See application file for complete search history.

(56) References Cited

U.S. PATENT DOCUMENTS

| | | | |
|---|---|---|---|
| 2013/0329629 A1* | 12/2013 | Bao ................... | H04W 36/0083 370/315 |
| 2014/0247810 A1* | 9/2014 | Bontu ............... | H04W 36/0094 370/332 |
| 2014/0301370 A1* | 10/2014 | Sivavakeesar ........... | H04B 7/15 370/331 |
| 2015/0043422 A1* | 2/2015 | Fujishiro ............... | H04W 16/26 370/315 |
| 2015/0049734 A1* | 2/2015 | Park ...................... | H04W 36/08 370/331 |
| 2015/0296424 A1* | 10/2015 | Xu ..................... | H04W 36/0033 370/331 |
| 2016/0037568 A1* | 2/2016 | Hakola ................. | H04W 8/005 370/329 |

FOREIGN PATENT DOCUMENTS

| | | |
|---|---|---|
| JP | 2003-231467 A | 8/2003 |
| WO | 2012/041387 A1 | 4/2012 |
| WO | 2012/106992 A1 | 8/2012 |
| WO | 2012/109970 A1 | 8/2012 |

OTHER PUBLICATIONS

3rd Generation Partnership Project, "Functional stage 2 description of Location Services (LCS)(Release 10)", 3GPP TS 23.271 V10.2.0, Mar. 2011.
3rd Generation Partnership Project, "Evolved Universal Terrestrial Radio Access (E-UTRA); Radio Resource Control (RRC); Protocol specification (Release 10)", 3GPP TS 36.331 V1 0.6.0, Jun. 2012.
3rd Generation Partnership Project, "Evolved Universal Terrestrial Radio Access (E-UTRA); User Equipment (UE) procedures in idle mode (Release 11)", 3GPP TS 36.304 V11.0.0, Jun. 2012.
3rd Generation Partnership Project, "Evolved Universal Terrestrial Radio Access (E-UTRA) and Evolved Universal Terrestrial Radio Access Network (E-UTRAN); Overall description; Stage 2 (Release 10)", 3GPP TS 36.300 V1 0.8.0, Jun. 2006.
3rd Generation Partnership Project, "Evolved Universal Terrestrial Radio Access Network (E-UTRAN); X2 application protocol (X2AP) (Release 11)", 3GPP TS 36.423 V11.1.0, Jun. 2012.
3rd Generation Partnership Project, "DeNB idenficiation in mobile relay handover procedure", 3GPP Draft, R3-121104, 3GPPTSG RAN WG3 #76, May 2012 at Prague Czech Republic.
3rd Generation Partnership Project, "Key issues based on Alt1 relay", 3GPP Draft, R3-120104, 3GPP TSG RAN WG3#75, Feb. 2014 at Dresden, Germany.
International Search Report for PCT Application No. PCT/JP2013/068310, mailed on Jan. 8, 2014.
Japanese Office Action for JP Application No. 2014-561206 mailed on Jan. 6, 2016 with English Translation.
New Postcom, RN Initial Attachment Procedure, R3-102027, 3GPP, Aug. 15, 2010. Cited in JPOA.
Huawei, Dual-Mobile Relay Solution Based on Alt-2 RN Architecture, R3-120853, 3GPP, Mar. 30. 2012. Cited in JPOA.
LG Electronics Inc, Issues on the Handover Procedure for Mobile Relay, R3-112918, 3GPP, Nov. 5, 2011. Cited in JPOA.
Potevio, DeNB identification in mobile relay handover procedure, R3-120195, 3GPP, Jan. 31, 2012. Cited in JPOA.
Potevio, DeNB identification in mobile relay handover procedure, R3-120687, 3GPP, Mar. 30, 2012. Cited in JPOA.
Office Action issued Aug. 2, 2017 in corresponding Chinese Patent Application No. 2013800375114.

* cited by examiner

COMMUNICATION SYSTEM

This application is a National Stage Entry of PCT/JP2013/068310 filed on Jun. 27, 2013, which claims priority from United Kingdom Patent Application 1212537.3 filed on Jul. 13, 2012, the contents of all of which are incorporated herein by reference, in their entirety.

TECHNICAL FIELD

The present invention relates to a communication system and to components thereof for providing relay services to mobile or fixed communication devices. The invention has particular, but not exclusive, relevance to handover triggers and measurements for mobile relays used in Long Term Evolution (LTE) Advanced systems as currently defined in associated $3^{rd}$ Generation Partnership Project (3GPP) standards documentation.

BACKGROUND ART

Relaying is considered for LTE Advanced as a tool to improve, for example, the coverage of high data rates for User Equipment (UE), temporary network deployment, cell edge throughput and/or to provide coverage in new cell areas. LTE Advanced supports relaying by having a Relay Node (RN) wirelessly connected to a base station (eNB) (referred to as a Donor eNB (DeNB)). In addition to serving its own 'donor' cell, the Donor eNB serves the RN, via a modified version of the Evolved Universal Terrestrial Radio Access (E-UTRA) radio interface. The modified interface is referred to as the 'Un' interface.

Each RN is provided with many aspects of a base station's functionality and is therefore capable of acting as a base station serving its own 'relay' cell. From the perspective of the user equipment (such as mobile telephones) in the relay cell, therefore, the RN essentially appears to be a conventional LTE base station. In addition to the base station functionality, however, the RN also supports a subset of the UE functionality including, for example, many aspects of the physical layer, Medium Access Control (MAC), radio resource control (RRC), and non access stratum (NAS) functionality, to allow it to connect wirelessly to a Donor eNB. From the perspective of the Donor eNB, therefore, the RN essentially appears to be an item of user equipment such as a mobile (cellular) telephone.

As mobile telephones move around in the area covered by the communication system, they are handed over from one cell (i.e. base station) to another, depending on signal conditions and other requirements, such as requested quality of service, the type of service used, overall system load, and the like. A trigger for handing over a mobile telephone to a new cell may be based on measurements of the neighbour cells performed by the particular mobile telephone. The type of triggers and the related measurements to be performed by mobile telephones are detailed in section 5.5.4 of the 3GPP TS 36.331 v10.5.0 standard. In particular, the above standard defines measurement report triggering related to eight different event types (Events A1 to A6, B1, and B2) that the base station may configure for user equipment within its cell(s). In summary, such triggers may generally relate to an event when the mobile telephone's serving cell (or a neighbouring cell) becomes better (or becomes worse) than either a pre-defined threshold or a pre-determined offset value.

Further details of the overall mobility sequence are described in section 10.1.2 of the 3GPP TS 36.300 standard, which describes the configuration of measurements by the base station and the subsequent triggering of handover.

SUMMARY OF INVENTION

Technical Problem

In some situations, the RN will be installed in a moving vehicle, such as on a train, bus, ship, aeroplane, or the like. Such a Mobile RN (MRN) will hence change its attachment from one Donor eNB to another as the vehicle is moving. However, from the perspective of the mobile telephones, no handover occurs, as they remain served by the same cell(s) of the mobile relay node even when the mobile relay node changes its point of attachment to the network.

Since relay nodes appear to be like any other user equipment to the donor base station, it will try to re-use the measurement reporting and handover mechanisms defined for user equipment in the above standards. However, since mobile relay nodes might be installed on high speed trains or aeroplanes, these existing measurements might be less accurate in the case of a mobile relay node than in the case of a conventional mobile telephone. Furthermore, such measurements take time to perform, which might inhibit successful handover of mobile relay nodes between base stations in such a high-speed environment.

Moreover, existing UE measurements cannot distinguish between DeNB cells and non-DeNB cells (i.e. eNB's that cannot act as donors for relay nodes) because mobile telephones do not require the provision of donor services by their serving/target base station. If a measurement event is triggered in an MRN by a non-DeNB cell (i.e. a cell of a base station in which donor base station services are not provided), then the measurement event will be irrelevant for MRN handover purposes. Some measurement events may be triggered by any of the neighbour cells. However, if the neighbour cell triggering an event is not an allowed DeNB cell then the event is not a useful trigger for performing a successful MRN handover. Carrying out such measurements is thus wasteful of the MRN's and the base station's resources.

The present invention aims to provide an improved communication system and improved components of the communication system which overcome or at least alleviate one or more of the above issues. In particular, the invention aims to provide a robust handover mechanism for mobile relay nodes that reduces handover failure caused by the high speed of the MRN and by some neighbour cells not being allowed DeNB cells, whilst minimising the measurements and/or related signalling required.

Solution to Problem

Accordingly one aspect of the present invention provides a base station for a communication system comprising a plurality of base stations and for initiating a handover of a mobile relay node currently served by said base station, the base station comprising: means for associating a serving cell of the base station with said mobile relay node for providing the mobile relay node with access to the communication system; means for obtaining information that: identifies at least one further base station; and that indicates that said at least one further base station is capable of providing donor services to said mobile relay node via at least one cell operated by said at least one further base station; means for determining when said mobile relay node requires handover to a different cell than the serving cell; means for selecting, from the at least one cell of the at least one further base station identified by said obtained information, a target cell for said handover of said mobile relay node; and means for performing handover of the mobile relay node to the selected target cell.

Another aspect of the present invention provides a mobile relay node for a communication system comprising a plurality of base stations and for providing information for handover target cell selection by a current base station serving the mobile relay node, the mobile relay node comprising: means for associating with a serving cell of the current base station operating as a donor base station; means for obtaining information that: identifies at least one further base station; and that indicates that said at least one further base station is capable of providing donor services to said relay node via at least one cell operated by said at least one further base station; means for configuring and performing measurements of communication characteristics of at least one cell having a coverage area in which said mobile relay node is located; and means for reporting, to said current base station, at least one measurement report comprising results of said measurements; wherein said mobile relay node is operable: to provide, in said at least one measurement report, results of measurements in relation to at least one cell of the at least one further base station identified by said obtained information; and not to provide, in said at least one measurement report, results of measurements in relation to a cell having a coverage area in which said mobile relay node is located but which is not operated by the at least one further base station identified by said obtained information.

Another aspect of the present invention provides a system comprising a base station as described above and a mobile relay node as described above.

Another aspect of the present invention provides a method performed by a base station, in a communication system comprising a plurality of base stations, for initiating a handover of a relay node currently served by said base station, the method comprising: associating a serving cell of the base station with said mobile relay node for providing the mobile relay node with access to the communication system; obtaining information that: identifies at least one further base station; and that indicates that said at least one further base station is capable of providing donor services to said mobile relay node via at least one cell operated by said at least one further base station; determining when said mobile relay node requires handover to a different cell than the serving cell; selecting, from the at least one cell of the at least one further base station identified by said obtained information, a target cell for said handover of said mobile relay node; and performing handover of the mobile relay node to the selected target cell.

Another aspect of the present invention provides a method performed by a mobile relay node, in a communication system comprising a plurality of base stations, for providing information for handover target cell selection by a current base station serving the mobile relay node, the method comprising: associating with a serving cell of the current base station operating as a donor base station; obtaining information that: identifies at least one further base station; and that indicates that said at least one further base station is capable of providing donor services to said relay node via at least one cell operated by said at least one further base station; configuring and performing measurements of communication characteristics of at least one cell having a coverage area in which said mobile relay node is located; and reporting, to said current base station, at least one measurement report comprising results of said measurements; wherein in said reporting step said mobile relay: provides, in said at least one measurement report, results of measurements in relation to at least one cell of the at least one further base station identified by said obtained information; and does not provide, in said at least one measurement report, results of measurements in relation to a cell having a coverage area in which said mobile relay node is located but which is not operated by the at least one further base station identified by said obtained information.

Another aspect of the present invention provides a computer program product comprising computer implementable instructions for causing a programmable computer device to become configured as a base station as described above or as a mobile relay node as described above.

The invention also provides corresponding methods and computer software products that may be provided on a carrier signal or on a recording medium, such as a CD, DVD or the like.

BRIEF DESCRIPTION OF THE DRAWINGS

Embodiments of the invention will now be described, by way of example only, with reference to the attached figures in which.

DESCRIPTION OF EMBODIMENTS

Overview

Figure 1:
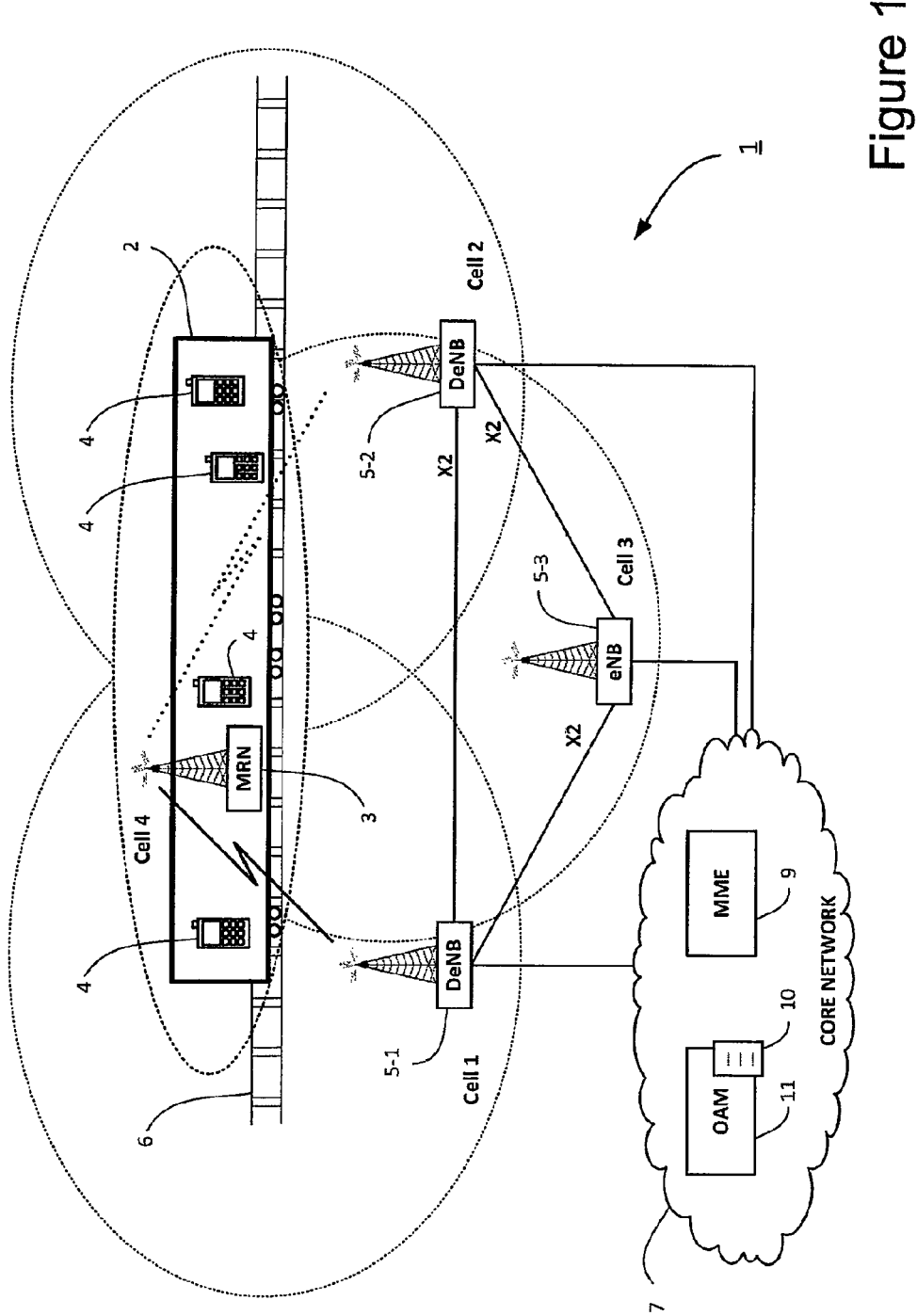
FIG. 1 schematically illustrates a mobile telecommunication system having a mobile relay node mounted in a train.

FIG. 1 schematically illustrates a mobile (cellular) telecommunication system 1 that includes a train 2 having a mobile relay node 3 that provides base station functionality for a plurality of user equipment 4, e.g. mobile telephones, carried by users in the train 2. The mobile relay node 3 attaches to donor base stations 5-1 to 5-2 as the train 2 travels along a track 6. The donor base stations 5-1 to 5-2 each operate a number of cells (i.e. Cell 1 and Cell 2, respectively), within which they provide donor base station services. In this example, base station 5-3 operates Cell 3 in which donor base station services are not available (and therefore mobile relay node 3 is unable to connect to base station 5-3 as a relay node).

The base stations 5 are coupled to a core network 7 that includes, amongst other, a Mobility Management Entity (MME) 9 that manages the mobility of mobile telephones 4 within the core network 7 and an Operations and Maintenance unit (OAM) 11 which configures the various devices in the network. In this system, the base stations 5 are coupled to each other via an X2 interface.

As the train 2 travels along the track 6, the geographical location of the mobile relay node 3 changes and hence it will be necessary to hand over the mobile relay node 3 to a new base station 5 as if it were a mobile telephone 3.

Advantageously, in the embodiments that will be described in more detail below, the mobile relay node 3 and the donor base station 5-1 currently serving the mobile relay node 3 configure and carry out handover related measurements and signalling, in support of the hand over of the mobile relay node 3, taking into account a list 10 of allowed donor base stations to which the mobile relay node 3 can connect. The list 10 of allowed donor base stations may be obtained, for example, from the OAM 11 and comprises information identifying at least those base stations 5 of the communication network 1, which can provide donor base station services for the given mobile relay node 3. The list 10 of allowed donor base stations will typically comprise a subset of all the base stations that will be within range of the mobile relay node 3 as it travels along its route. The donor base station 5-1 (or the mobile relay node 3) then selects a handover target cell for the mobile relay node 3 from amongst the cells that belong to the donor base stations 5 identified in the list 10 of allowed donor base stations. In this way, the incidence of failed handover attempts can be reduced significantly.

Mobile Relay Node

Figure 2:
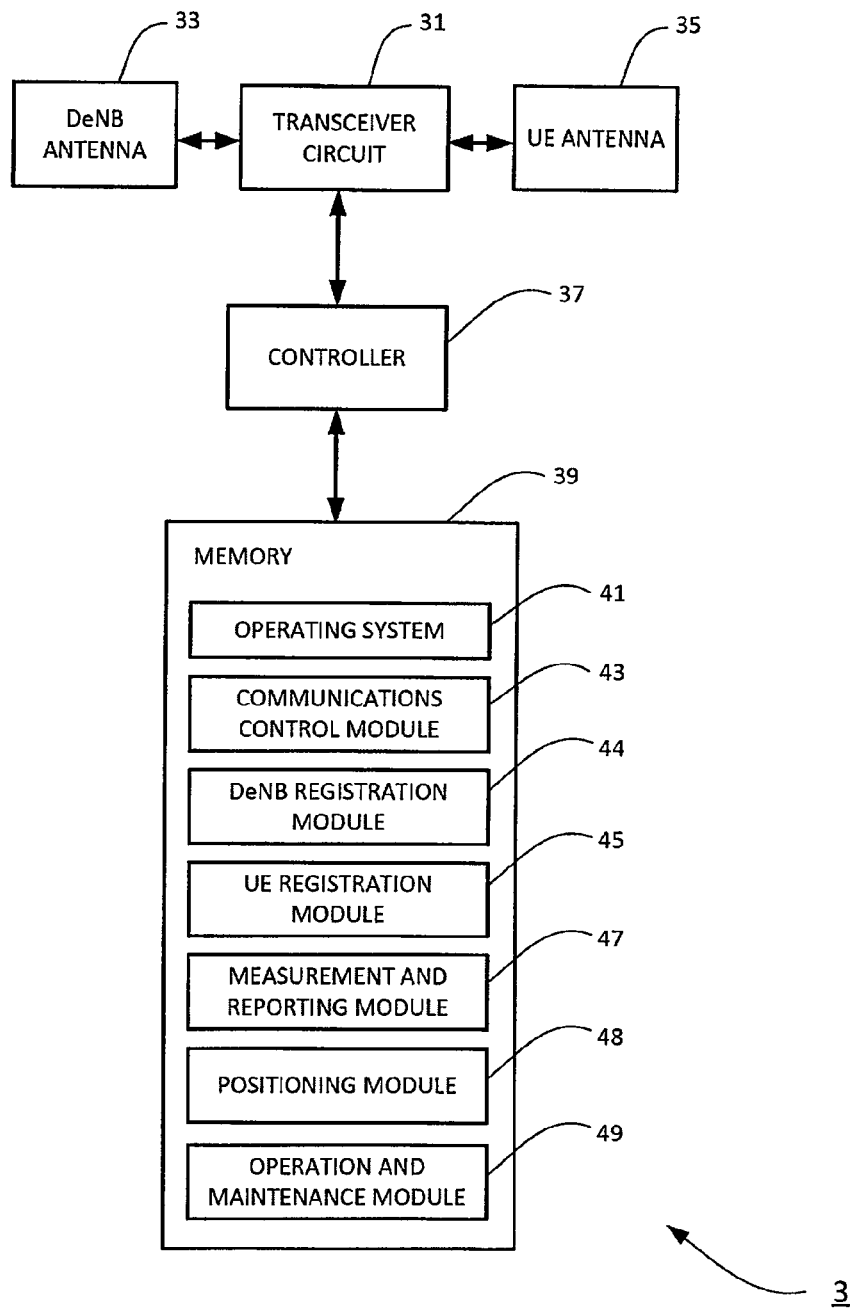
FIG. 2 is a block diagram illustrating the main components of the mobile relay node forming part of the system shown in FIG. 1.

FIG. 2 is a block diagram illustrating the main components of the mobile relay node 3 shown in FIG. 1. The mobile relay node 3 is a communications node like the base station, providing services within its own coverage area, but the mobile relay node 3 does not connect directly to the core network 7. Instead, it connects wirelessly to a donor base station 5, which then provides a connection to the core network 7.

As shown, the mobile relay node 3 includes a transceiver circuit 31 which transmits signals to, and receives signals from, the donor base station 5 via donor base station (DeNB) antenna 33 and which transmits signals to, and receives signals from, the user equipment 4 on the train 2 via the UE antenna 35. The operation of the transceiver circuit 31 is controlled by a controller 37 in accordance with software stored in memory 39. The software includes, among other things, an operating system 41, a communications control module 43, a donor base station (DeNB) registration module 44, a user equipment (UE) registration module 45; a measurement and reporting module 47; a positioning module 48; and an operation and maintenance module 49.

The communications control module 43 controls communication with the user equipment 4 and the donor base station 5 including, for example, allocation of resources to be used by the transceiver circuit 31 in its communications with each of the user equipment 4 and with the donor base station 5.

The donor base station registration module 44 performs registration of the mobile relay node 3 with a donor base station 5, for example, during start up or handover of the mobile relay node 3. The user equipment registration module 45 keeps track of user equipment 4 served by the cell(s) of the mobile relay node 3.

The measurement and reporting module 47 performs signal measurements according to measurement events configured by the donor base station 5-1 or the operation and maintenance module 49. The measurement and reporting module 47 also generates and sends measurement reports to the donor base station 5.

The positioning module 48 performs procedures for obtaining information relating to the geographical location of the mobile relay node 3.

The operation and maintenance module 49 is operable to interface with the OAM entity 11 in the core network 7 for setting up and storing operating parameters of the mobile relay node 3.

Donor Base Station

Figure 3:
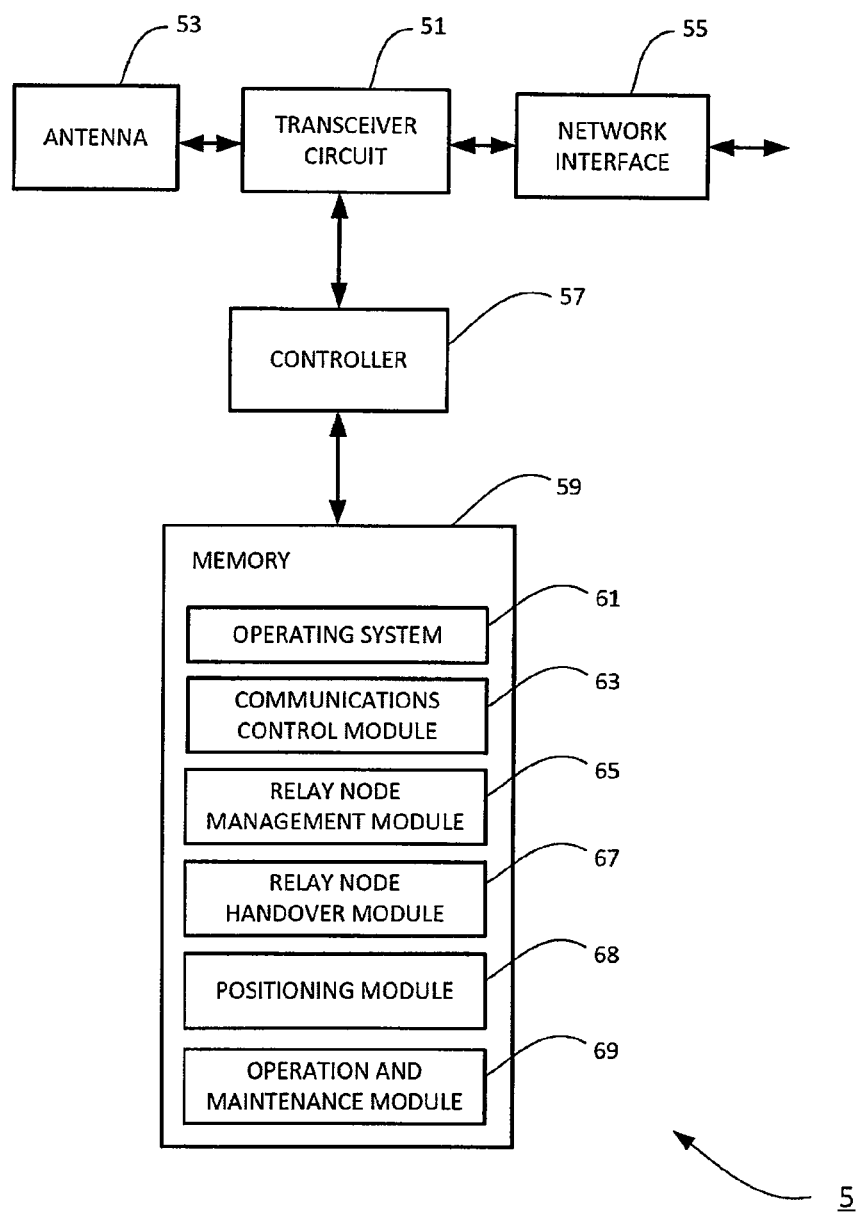
FIG. 3 is a block diagram illustrating the main components of a donor base station forming part of the system shown in FIG. 1.

FIG. 3 is a block diagram illustrating the main components of a donor base station 5, such as the donor base station 5-1 shown in FIG. 1. The donor base station 5 is a fixed communications node providing services to user equipment 4 within its coverage area. In the embodiments according to the invention, the donor base stations 5 communicate with the user equipment 4 on the train 2 via the mobile relay node 3. As shown, the donor base station 5 includes a transceiver circuit 51 which transmits signals to, and receives signals from, the mobile relay node 3 via at least one antenna 53. The donor base station 5 also transmits signals to and receives signals from the core network 7 and other neighbouring base stations 5 via a network interface 55 (X2 interface for communicating with neighbouring base stations 5 and S1 interface for communicating with the core network 7). The operation of the transceiver circuit 51 is controlled by a controller 57 in accordance with software stored in memory 59. The software includes, among other things, an operating system 61, a communications control module 63, a relay node management module 65, a relay node handover module 67, a positioning module 68, and an operation and maintenance module 69.

The communications control module 63 controls communications between the donor base station 5 and the mobile relay nodes 3, user equipment 4, and the network devices such as the MME 9 and the OAM 11.

The relay node management module 65 controls the connection between the base station 5 and the relay nodes 3 attached thereto.

The relay node handover module 67 configures measurements for the mobile relay node 3 to be carried out in relation to selecting a handover target cell. The relay node handover module 67 obtains information identifying a target cell to which the mobile relay node 3 can connect.

The positioning module 68 performs procedures for obtaining information related to the geographical location of the mobile relay node 3.

The operations and maintenance module 69 interfaces with the OAM entity 11 in the core network 7 for setting up and storing operating parameters of the base station 5.

In the above description, the mobile relay node 3 and the donor base station 5 are described for ease of understanding as having a number of discrete modules (such as the communications control modules and the operation and maintenance modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of different embodiments will now be described that illustrate how the invention can be put into effect using the above relay node 3 and donor base station 5. The embodiments will be described with reference to the flow charts shown in FIGS. 4 to 11.

List Based Handover Triggering

First Embodiment

Figure 4:
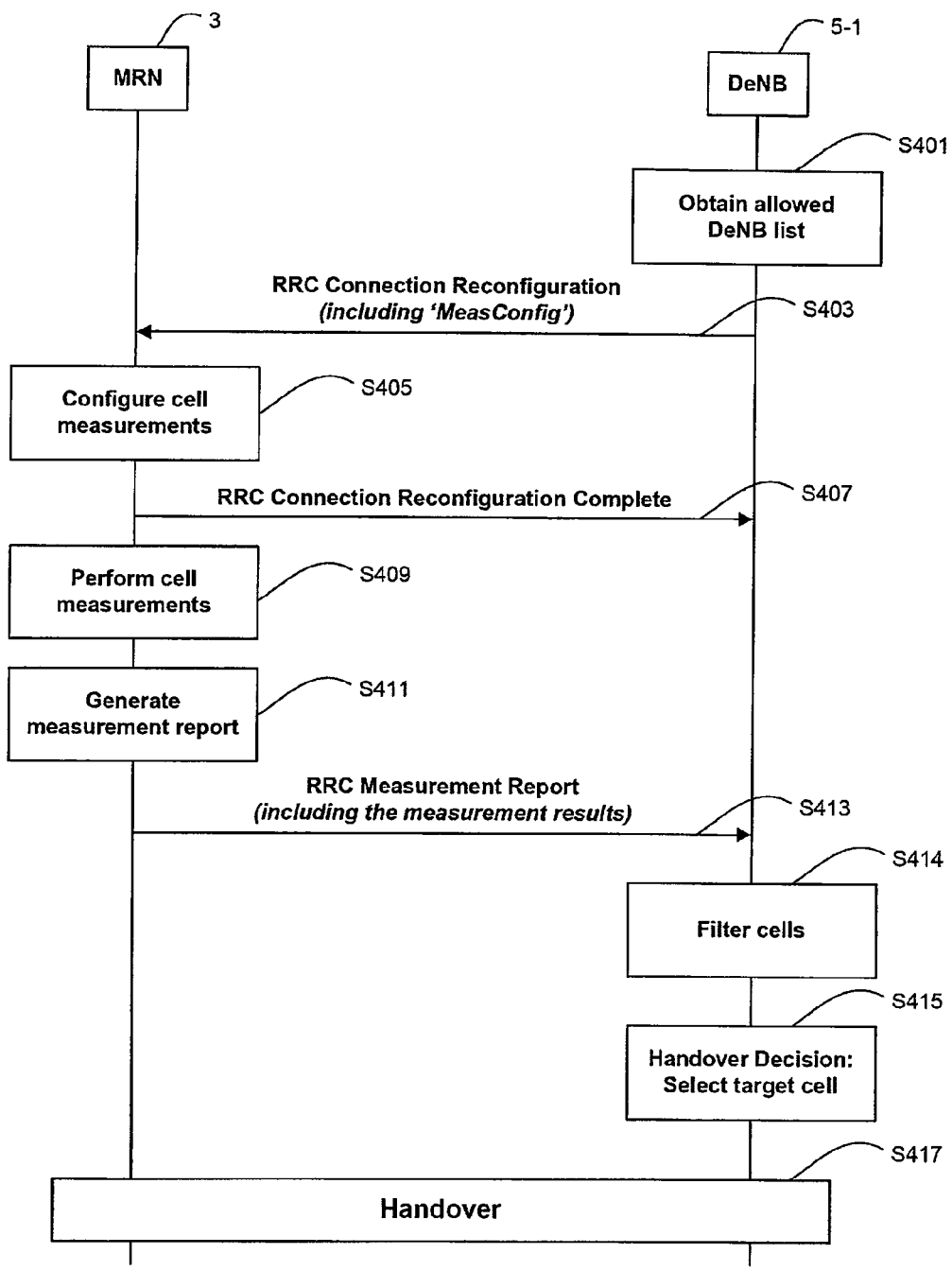
FIG. 4 shows an example timing diagram illustrating a method performed by components of the communication system when configuring and performing handover related measurements and reporting, using a list of allowable donor base stations.

FIG. 4 shows an example timing diagram illustrating a method performed by components of the communication system 1 when configuring and performing handover related measurements and reporting, using a list 10 of allowable donor base stations. In this embodiment, the list 10 of allowed donor base stations is used by the donor base station 5-1 currently serving the mobile relay node 3. In particular, the donor base station 5-1 uses the list 10 to perform filtering of measurement reports received from the mobile relay node 3, for cells in the vicinity of the mobile relay node 3, against the allowed donor base station list, to identify those measurement reports that relate to cells of each base station 5 that is capable of providing donor services. A handover decision is then performed based on the measurement reports relating to cells of each base station 5 that is capable of providing donor services, and not measurement reports relating to cells of base stations 5 that are not capable of providing donor services, such that the serving donor base station 5-1 will only trigger handover towards a base station which is included on the list 10.

As shown, in step s401, the donor base station 5-1 obtains, e.g. from the OAM 11 using its operation and maintenance module 69, and stores in its memory 59, a list 10 of allowed donor base stations. The list 10 includes at least those base stations which can provide donor base station services for the given mobile relay node 3 (which typically may be a subset of all base stations that can provide donor base station services). Alternatively, the list 10 of allowed donor base stations may include all base stations of the communication system 1 which provide donor base station services.

In step s403, the relay node handover module 67 generates and sends (via the transceiver circuit 51) an 'RRC Connection Reconfiguration' message to the mobile relay node 3. This message requests the MRN 3 to perform the same measurements as those performed by user equipment (such as mobile telephones) served by this base station 5-1. It does this by including in this message a 'MeasConfig' information element (IE), which specifies the kind of measurements and the conditions under which the measurements need to be initiated by the mobile relay node 3. In particular, the 'MeasConfig' IE includes measurement parameters for at least one of the event types (i.e. Events A1 to A6, B1, and B2) as specified in the 3GPP TS 36.331 v10.6.0 standard, the contents of which are hereby incorporated by reference. Such parameters may specify, for example, a threshold signal level for a current serving cell, below which signal level the mobile relay node 3 will start the configured measurements. This will effectively result in the mobile relay node 3 performing a search for other base station cells to which it can be handed over when it is experiencing a degradation in signal quality within the current cell (e.g. due to the mobile relay node 3 moving away from the donor base station 5-1).

When a condition defined in the 'MeasConfig' IE has been met, in step s409, the mobile relay node 3 performs the necessary cell measurements in respect of cells that are identified by the donor base station 5-1 in the 'MeasConfig' IE. (In this embodiment, the cells identified by the donor base station 5-1 are not restricted to those on the allowed DeNB list 10 and may include other neighbouring cells to which the relay node 3 is not allowed to connect). The mobile relay node 3 then performs the required measurements in the same way that user equipment served by the donor base station 5-1 will perform the measurements. Once the measurements are completed, in step s411, the mobile relay node 3 generates a measurement report, which it sends, in step s413, to the donor base station 5-1 in an 'RRC Measurement Report' message. This measurement report includes the results of the cell measurements performed in step s409.

After the donor base station 5-1 has received the Measurement Report, it filters the measurement results, in step s414, based on the stored list 10 of allowed donor base stations that it obtained in step s401. In particular, the donor base station 5-1 discards or ignores measurement results relating to cells operated by base stations that are not included in the list 10 of allowed donor base stations. Subsequently, in step s415, the donor base station 5-1 makes a handover decision for the mobile relay node 3 based on the measurement results that have not been discarded or ignored in step s414, and therefore selects a target cell for the handover which belongs to a donor base station (e.g. base station 5-2) which is on the list 10 of allowed donor base stations. This decision is thus based on information identifying a target cell that is capable of providing donor services.

Finally, in step s417, the donor base station 5-1 and the mobile relay node 3 perform the handover procedures to the target cell, i.e. the mobile relay node 3 detaches from base station 5-1 and re-attaches to the new donor base station (e.g. donor base station 5-2) associated with the cell selected in step s415.

Second Embodiment

Figure 5:
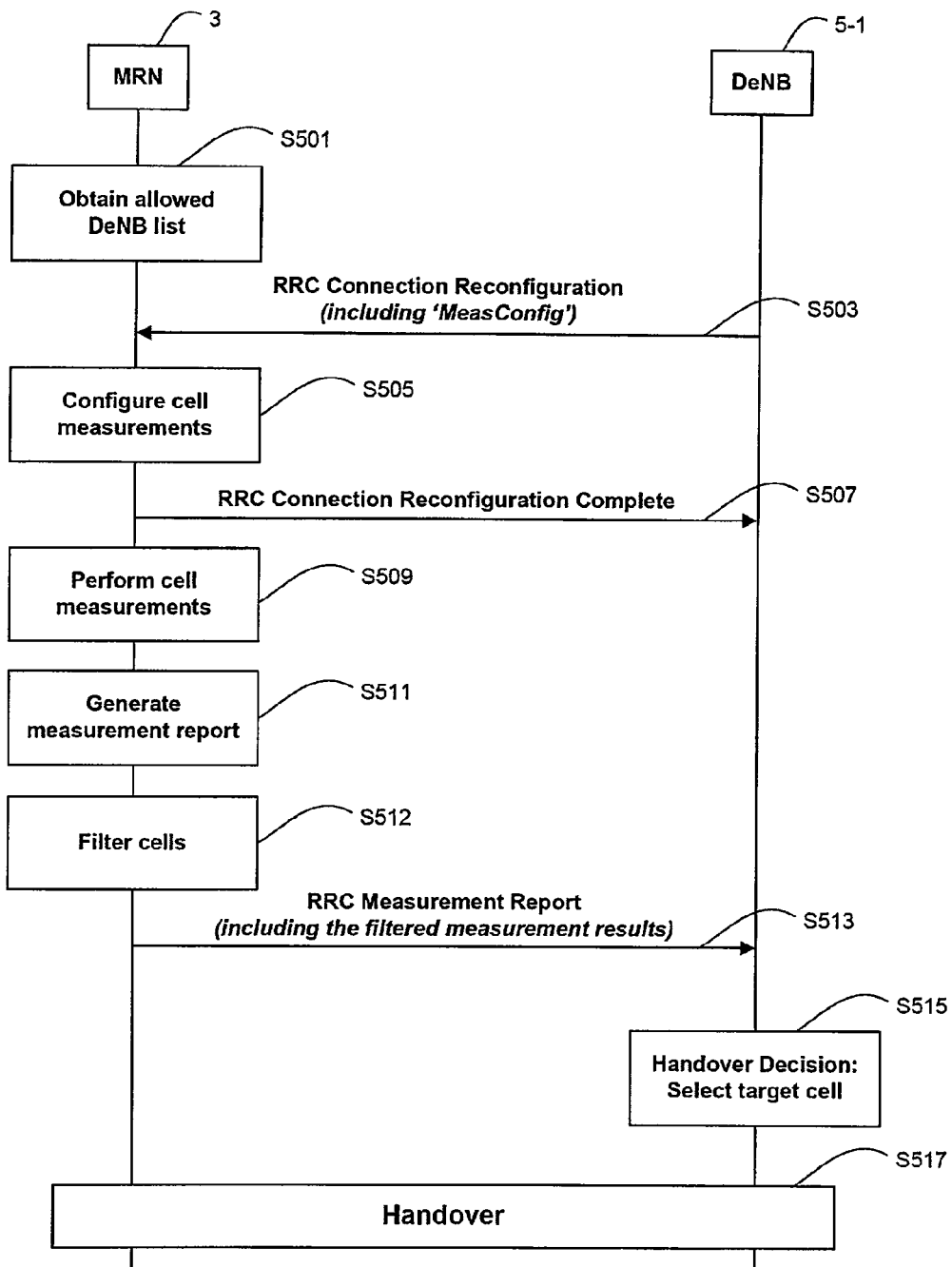
FIG. 5 shows another example timing diagram illustrating a method performed by components of the communication system when configuring and performing handover related measurements and reporting, using a list of allowable donor base stations.

FIG. 5 shows another example timing diagram illustrating a method performed by components of the communication system 1 when configuring and performing handover related measurements and reporting, using a list 10 of allowable donor base stations. In this embodiment, the list 10 of allowed donor base stations is obtained and used by the mobile relay node 3 rather than the donor base station 5-1. In particular, the mobile relay node 3 uses the list 10 to perform filtering of measured cells against the allowed donor base stations such that it will provide measurement reports, to the donor base station 5-1, for those cells which are operated by base stations included in the list 10 (and therefore that are capable of providing donor services) but will not provide measurement reports for those cells which are operated by base stations that are not capable of providing donor services. Accordingly, in this way the serving donor base station 5-1 does not receive measurement results for cells operated by base stations that are not capable of providing donor services, and thus does not trigger handover to the cells of base stations which are not included in the list 10 and are therefore not capable of providing donor services. Hence, this ensures that the serving donor base station 5-1 will trigger handover to a cell which is operated by a base station that is capable of providing donor services.

As shown, in this embodiment, in step s501, the mobile relay node 3 obtains, e.g. from the OAM 11, and stores in its memory 39, a list 10 of allowed donor base stations—with which the mobile relay node 3 is allowed to connect and which can provide donor base station services to that mobile relay node 3. In one alternative, the list 10 of allowed donor base stations may include all base stations of the communication system 1 which can provide donor base station services.

In step s503, the donor base station 5-1 (using its relay node handover module 67 and its transceiver circuit 51) generates and sends an 'RRC Connection Reconfiguration' message to the mobile relay node 3. As before, the donor base station 5-1 includes in this message a 'MeasConfig' information element (IE), which specifies the kind of measurements and the conditions under which the measurements need to be initiated by the mobile relay node 3. In particular, the 'MeasConfig' IE includes measurement parameters for at least one of the event types (i.e. events A1 to A6, B1, and B2) as specified in the 3GPP TS 36.331 v10.6.0 standard. The mobile relay node 3 will use these measurement parameters to control when it starts making measurements on the signals from other base stations in order to find another base station 5 to which the mobile relay node 3 can handover when it is experiencing a degradation in signal quality in the current cell (e.g. due to the mobile relay node 3 moving away from the donor base station 5-1) and/or when the signals from the other base stations become better than a pre-set threshold.

In step s505, the mobile relay node 3 configures its measurement and reporting module 47 in accordance with the received 'MeasConfig' IE and starts monitoring whether or not a condition defined therein is met. Then, in step s507, the mobile relay node 3 confirms that the measurement reconfiguration has been successful by generating and sending an 'RRC Connection Reconfiguration Complete' message to the donor base station 5-1.

When the measurement and reporting module 47 determines that a condition defined in the 'MeasConfig' IE has been met, in step s509, the mobile relay node 3 performs the cell measurements for the cells identified in the 'MeasConfig' IE. Once the measurements are completed, the mobile relay node 3 generates, in step s511, a measurement report.

Next, in step s512, the measurement and reporting module 47 of the mobile relay node 3 filters the measurement results in the measurement report based on the stored list 10 of allowed donor base stations obtained in step s501, to remove measurement results in respect of cells associated with base stations that are not included on the list 10 of allowed donor base stations. In step s513, the mobile relay node 3 generates and sends an 'RRC Measurement Report' message to the donor base station 5-1, and includes in this message the filtered measurement results, so that measurement results for cells associated with base stations that are in the list 10 of allowed donor base stations are reported to the currently serving donor base station 5-1 but measurement results for other base stations, not included in the list 10, are not reported.

After the donor base station 5-1 has received the Measurement Report from the mobile relay node 3, the donor base station 5-1 (e.g. its relay node handover module 67) makes, in step s515, a handover decision for the mobile relay node 3 by selecting one of the cells included in the Measurement Report as the target cell to which the mobile relay node 3 should be handed over. Since the Measurement Report includes cells belonging to donor base stations that are on the list 10 of allowed donor base stations and does not include cells belonging to base stations that do not provide donor services, the currently serving donor base station 5-1 will select a target cell to which the mobile relay node 3 can handover successfully. This decision is thus based on information identifying a target cell that is capable of providing donor services.

Finally, in step s517, the donor base station 5-1 and the mobile relay node 3 perform the handover procedures to the target cell, i.e. the mobile relay node 3 detaches from base station 5-1 and re-attaches to the new donor base station (e.g. donor base station 5-2) associated with the cell selected in step s515.

Route Based Handover Triggering

Third Embodiment

Figure 6:
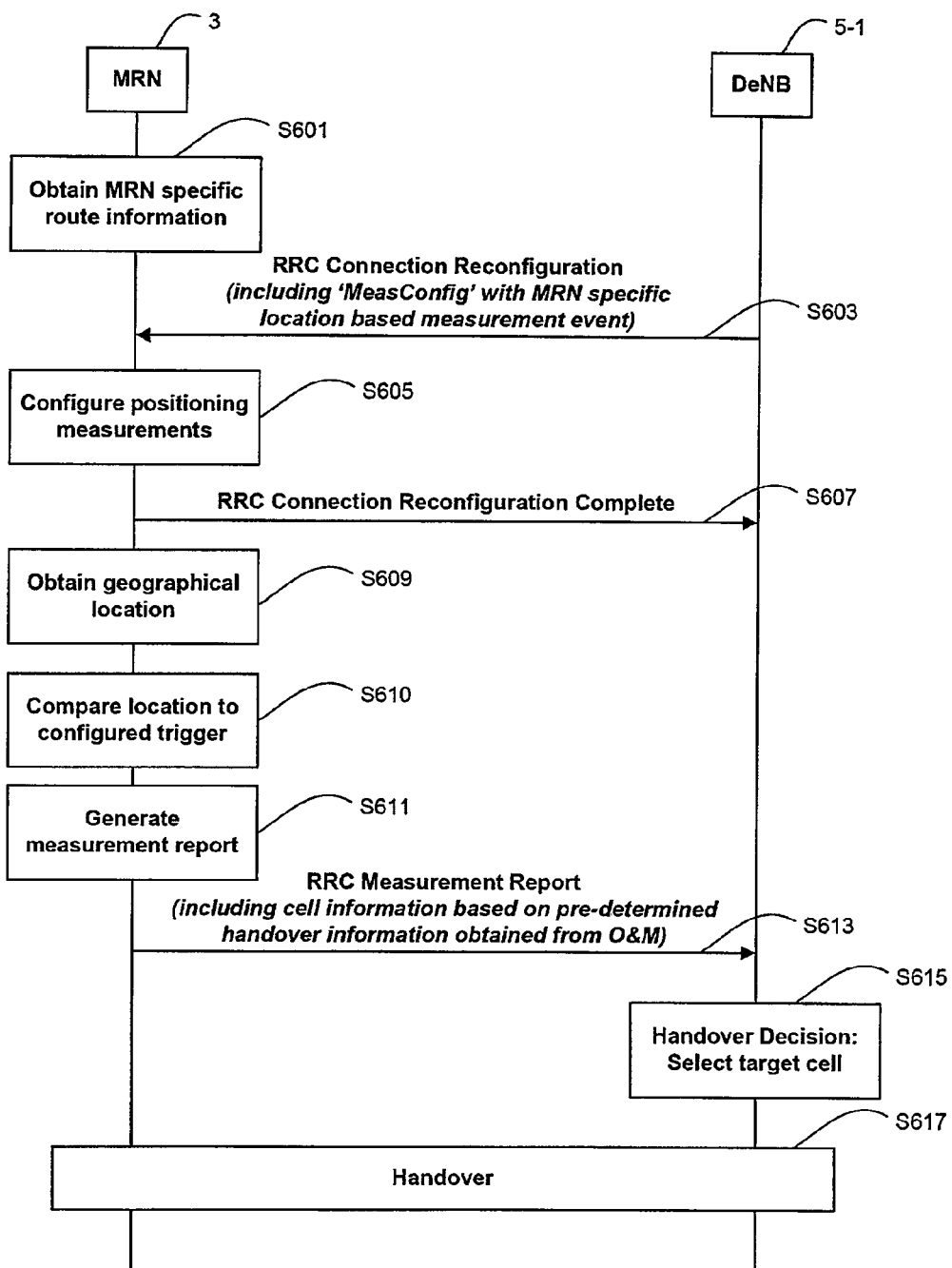
FIG. 6 shows an example timing diagram illustrating a method performed by components of the communication system when configuring and performing handover related measurements and reporting, using route information and positioning measurements.

FIG. 6 shows an example timing diagram illustrating a method performed by components of the communication system 1 when configuring and performing handover related measurements and reporting, using route information.

In this embodiment, the geographical position of the mobile relay node 3 is measured and reported by taking into account information on the planned route of the mobile relay node 3 (e.g. a relay node mounted on a train which is travelling along a pre-determined route) within the area covered by the communication system 1. In this case, route information is used instead of (or in addition to) the list 10 of allowed donor base stations to discard or ignore cells that are not relevant handover candidates for the mobile relay node 3.

First, in step s601, the mobile relay node 3 obtains, e.g. from the OAM entity 11, and stores in its memory 39 MRN specific route information (such as geographic coordinates, list of donor base stations along the route, next allowed DeNB cell depending on current cell and/or location, etc). For example, the mobile relay node 3 may download this route information at start-up. Such route information may be included with the RN's list 10 of allowed donor base stations or may be provided separately.

Next, in step s603, the donor base station 5-1 generates (i.e. using its relay node handover module 67) and sends (i.e. using its communications control module 63 and transceiver circuit 51) an 'RRC Connection Reconfiguration' message to the mobile relay node 3. The donor base station 5-1 includes in this message a 'MeasConfig' IE, which, in this case, configures location based events for the mobile relay node 3. In particular, the 'MeasConfig' IE includes conditions specifying for the mobile relay node 3 when and how to carry out positioning measurements and reporting. The conditions may rely upon, for example, the mobile relay node's current geographic location (e.g. monitoring whether or not the mobile relay node 3 has moved away from the current donor base station 5-1, monitoring whether or not it has arrived within a specified vicinity of a neighbour base station, and the like).

Preferably, the donor base station 5-1 configures these conditions using a 'Position Measurement' event (such as "RN handover required based on location" or "Event A2") and sends the 'Position Measurement' event to the mobile relay node 3 in an information element included in RRC signalling. The 'Position Measurement' event may also specify details of the required or preferred positioning method, and may also specify a minimum location accuracy, the type of positioning technique (e.g. A-GPS) to be used, and the like.

In step s605, the mobile relay node 3 configures its positioning module 48 to perform the positioning measurements in accordance with the received 'Position Measurement' event and starts monitoring whether or not a condition defined therein is met. Next, in step s607, the mobile relay node 3 confirms that the measurement reconfiguration has been successful by generating and sending an 'RRC Connection Reconfiguration Complete' message to the donor base station 5-1.

Subsequently, in step s609, the positioning module 48 obtains the geographical location of the mobile relay node 3, e.g. by positioning measurements or the like. This step may be performed only once, or continuously, or periodically, as defined in the received 'MeasConfig' IE.

In step s610, the measurement and reporting module 47 compares the current position of the mobile relay node 3 with the configured triggers and, if a configured condition is met, it proceeds to step s611, in which it generates a measurement report. In the measurement report, the measurement and reporting module 47 also identifies a target cell (of a candidate DeNB) which triggered the measurement event (e.g. a cell selected by comparing the MRN's current position to the MRN specific route information) and optionally any other allowed target cells.

Next, in step s613, the mobile relay node 3 generates and sends an 'RRC Measurement Report' message to the donor base station 5-1, and includes in this message the results of the measurements and the identification of the cell of the next donor capable base station (and any further optional cells of donor capable base stations) to which the mobile relay node 3 can be handed over.

In step s615, the relay node handover module 67 of the donor base station 5-1 makes a handover decision and selects a target cell identified in the message received in step s613 (e.g. Cell 2 of base station 5-2) for the mobile relay node 3, using the information received in step s613. This decision is thus based on information identifying a target cell that is capable of providing donor services. Since the cells that are indicated by the mobile relay node 3 belong to base station(s) on the list 10 of allowable donor base stations and that also meet the configured handover measurement criteria, handover failures due to attempted handovers to cells of base stations that are not capable of providing donor services are effectively prevented.

Finally, in step s617, the donor base station 5-1 and the mobile relay node 3 perform the handover procedures to the target cell, i.e. the mobile relay node 3 detaches from base station 5-1 and re-attaches to the new donor base station (e.g. donor base station 5-2) associated with the cell selected in step s615.

In this example, the mobile relay node 3 triggers handover procedures after comparing its own location with its pre-determined route information according to the criteria provided by the donor base station 5-1. Therefore, the mobile relay node 3 performs location calculations only (or obtains its own location in any suitable way), which beneficially reduces the overall number of measurements needed and thus minimises handover delay. Thus when the mobile relay node's current location matches a pre-defined location (or area), the mobile relay node 3 is handed over to the next donor base station which is selected using the mobile relay node's known route.

However, as will be described in detail with reference to the following figure, a mobile relay node 3 may also reduce the number of measurements by measuring its serving cell only.

Fourth Embodiment

Figure 7:
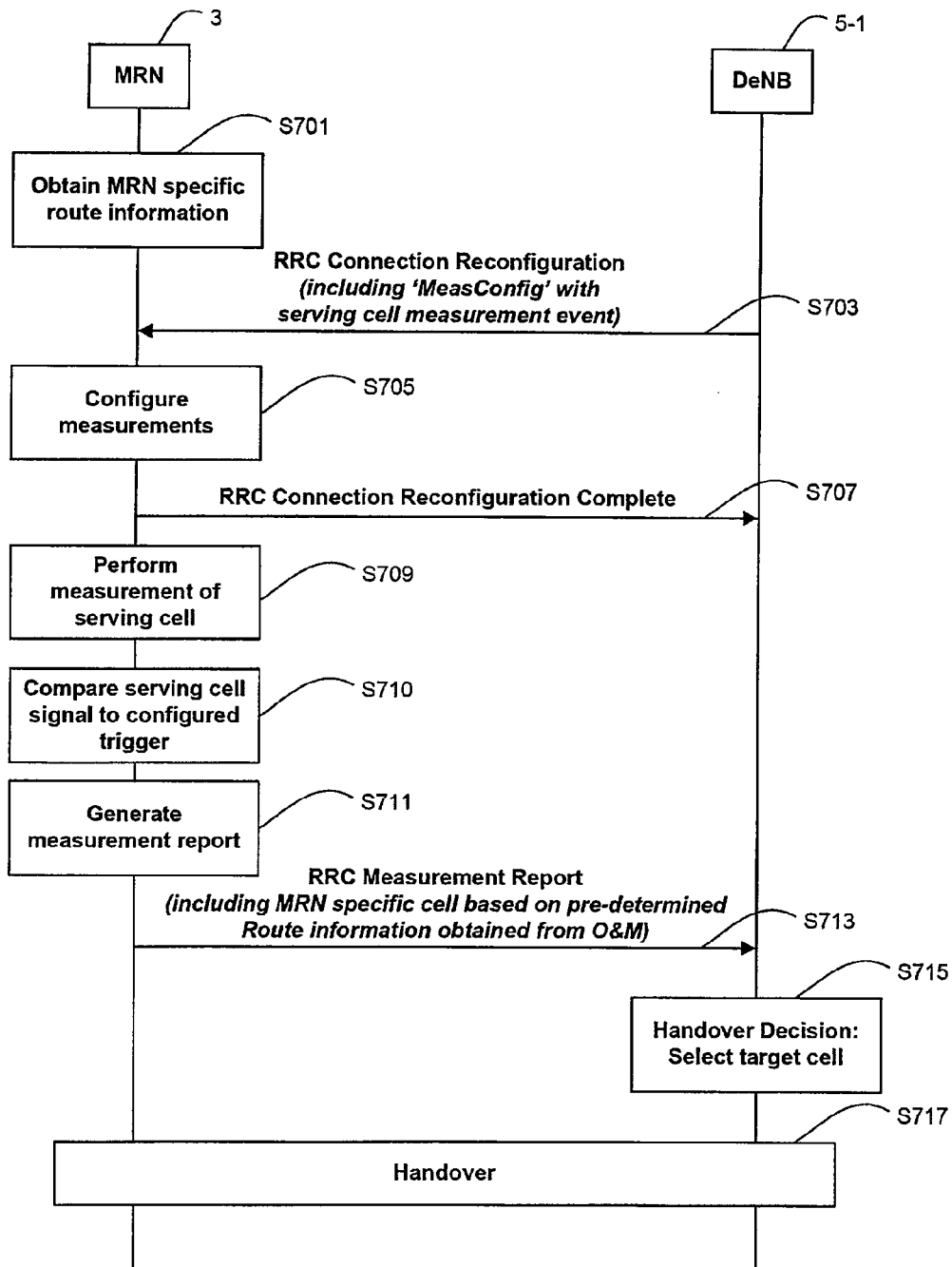
FIG. 7 shows an example timing diagram illustrating a method performed by components of the communication system when configuring and performing handover related measurements and reporting, using route information and measurement of the serving cell.

FIG. 7 shows an example timing diagram illustrating a method performed by components of the communication system 1 when configuring and performing handover related measurements and reporting, using route information and measurement of the serving cell.

Like in the previous embodiment, the mobile relay node 3 takes into account, in its report to the donor base station 5-1, information on the planned route of the mobile relay node 3 within the area covered by the communication system 1. However, in this case, the mobile relay node 3 performs measurements of the serving cell and uses the route information to select a handover candidate cell (or cells) when the measurement of the serving cell indicates that handover is necessary.

Initially, in step s701, the mobile relay node 3 obtains and stores in its memory 39 MRN specific route information (such as geographic coordinates, list of donor capable base stations along the route, next allowed DeNB cell depending on current cell and/or location, etc) as described with reference to step s601 above.

Next, in step s703, the donor base station 5-1 generates and sends an 'RRC Connection Reconfiguration' message to the mobile relay node 3, in a similar manner as in step s603. However, in this case the donor base station 5-1 relies on the fact that mobile, e.g. train-mounted, relay nodes follow a known route and therefore the next target DeNB cell can be pre-determined based on the route information. Therefore, the donor base station 5-1 includes in the 'RRC Connection Reconfiguration' message a 'MeasConfig' IE, which configures serving cell based measurement events for the mobile relay node 3. This message requests the mobile relay node 3 to carry out measurements and reporting for the current serving cell only. The message configures the relay node's measurement and reporting module 47 using a 'Serving Cell Measurement' event (such as "RN handover required based on serving cell below a threshold" or "Event A2") which is included in an information element in the RRC signalling.

Therefore, in step s705, the mobile relay node 3 configures its measurement and reporting module 47 to carry out the serving cell measurements according to the received 'Serving Cell Measurement' event and starts monitoring whether or not a condition defined therein is met. Next, in step s707, the mobile relay node 3 confirms that the measurement reconfiguration has been successful by generating and sending an 'RRC Connection Reconfiguration Complete' message to the donor base station 5-1.

Subsequently, in step s709, the measurement and reporting module 47 performs a measurement of the serving cell. This step may be performed only once, or continuously, or periodically, as defined in the received 'MeasConfig' IE.

In step s710, the measurement and reporting module 47 compares the results of the serving cell measurements with the configured triggers and, if a configured condition is met, it proceeds to step s711, and generates a measurement report. In the measurement report, the measurement and reporting module 47 also identifies a preferred target cell (and optionally any other allowed target cells) based on a comparison of the current cell and the MRN specific route information.

Next, in step s713, the mobile relay node 3 generates and sends an 'RRC Measurement Report' message to the donor base station 5-1, and includes in this message the results of the measurements and the identification of the cell of the next donor capable base station (and any further optional cells of donor capable base stations) to which the mobile relay node 3 can be handed over.

In step s715, the relay node handover module 67 (of the donor base station 5-1) makes a handover decision and selects a target cell identified in the message received in step s713 (e.g. Cell 2 of base station 5-2) for the mobile relay node 3, using the information received in step s713. This decision is thus effectively based on information identifying a target cell that is capable of providing donor services.

Finally, in step s717, the donor base station 5-1 and the mobile relay node 3 perform the handover procedures to the target cell, i.e. the mobile relay node 3 detaches from base station 5-1 and re-attaches to the new donor base station (e.g. donor base station 5-2) associated with the cell selected in step s715.

This procedure ensures that when the signal strength of the current cell falls below a pre-defined threshold, the mobile relay node 3 is handed over to the next donor base station which is selected based on the mobile relay node's known route. There is no need for the mobile relay node 3 to measure any candidate donor base stations. Since there are fewer measurements performed, handover delay can be significantly reduced.

It will be appreciated that there are a number of ways for the mobile relay node 3 to identify a target DeNB cell, depending on the information that is available about the mobile relay node's route and movement.

For example, the mobile relay node 3 may use serving cell information and history of previous serving cells (or previous donor base stations). The cell/DeNB history enables the MRN 3 to compare the current cell/DeNB against a predetermined order of cells/DeNBs for identifying the next donor cell.

The mobile relay node 3 may also use serving cell information in combination with location information (e.g. geographical position, velocity, direction of travel, and the like) obtained using its positioning module 48. In this case the MRN may compare the current cell/DeNB against a pre-determined order of cells/DeNBs (with location info) for identifying the next donor cell.

Autonomous Handover Triggering by the Mobile Relay Node

Fifth Embodiment

Figure 8:
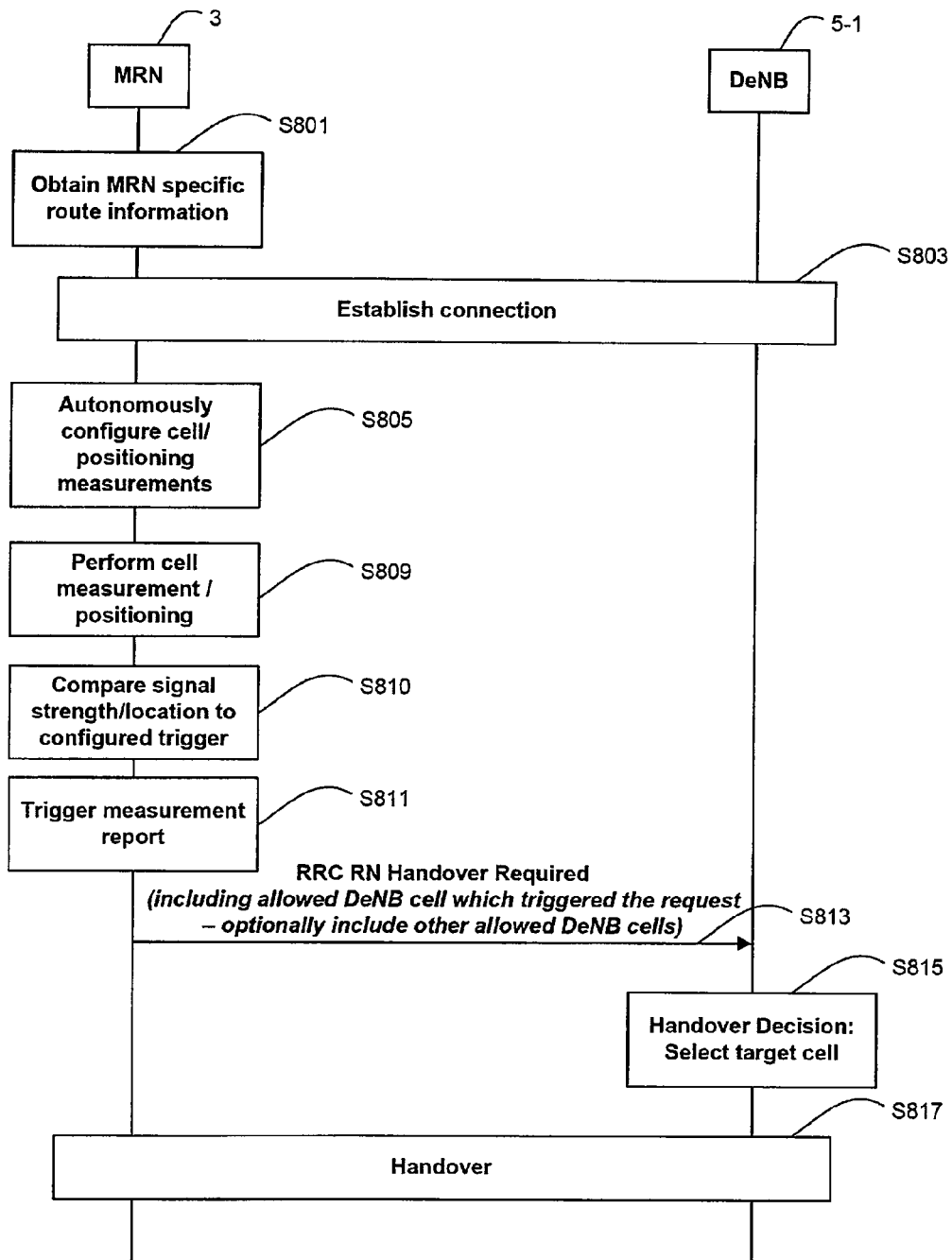
FIG. 8 shows an example timing diagram illustrating a method performed by components of the communication system when the mobile relay node autonomously configures and performs handover related measurements and reporting.

FIG. 8 shows an example timing diagram illustrating a method performed by components of the communication system 1 in case when the mobile relay node 3 autonomously configures its measurement and reporting module 47 to perform handover related measurements and reporting.

In this example, which generally follows the procedures described with reference to FIGS. 6 and 7, when the configured conditions are met, the mobile relay node 3 autonomously requests handover using an "RN Handover Required" RRC message.

Initially, in step s801, the mobile relay node 3 obtains and stores in its memory 39 MRN specific route information (such as geographic coordinates, next allowed DeNB cell, etc) as described with reference to step s601 above. In step s803, the mobile relay node 3 attaches to the donor base station 5-1. However, in this case there is no need for the donor base station 5-1 to configure position or serving cell based measurement events for the mobile relay node 3.

Instead, in step s805, the mobile relay node 3 autonomously configures its measurement and reporting module 47 to perform serving cell measurements (and/or configures its positioning module 48 to perform positioning measurement) and starts monitoring whether or not a handover condition is met. Next, in step s809, the measurement and reporting module 47 performs a measurement of the serving cell (and/or the positioning module 48 performs positioning procedures).

In step s810, the measurement and reporting module 47 compares the results of the serving cell/positioning measurements with the configured triggers and, if a configured condition is met, it then proceeds to step s811, and generates a measurement report. In the measurement report, the measurement and reporting module 47 identifies a preferred target cell (and optionally any other allowed target cells) based on a comparison of the current cell and the MRN specific route information.

Next, in step s813, the mobile relay node 3 generates and sends an 'RRC RN Handover Required' message to the donor base station 5-1, and includes in this message an identification of the cell of the next donor base station (and any further optional cells) to which the mobile relay node 3 can handover.

In step s815, the relay node handover module 67 (of the donor base station 5-1) makes a handover decision and selects a target cell (e.g. Cell 2 of base station 5-2) for the mobile relay node 3, using the information received in step s813. This decision is thus based on information identifying a target cell that is capable of providing donor services.

Finally, in step s817, the donor base station 5-1 and the mobile relay node 3 perform the handover procedures to the target cell, i.e. the mobile relay node 3 detaches from base station 5-1 and re-attaches to the new donor base station (e.g. donor base station 5-2) associated with the cell selected in step s815.

This example will beneficially reduce the processing and signalling required by the donor base station 5-1 serving the mobile relay node 3. Advantageously, in this case the donor base station 5-1 does not need to be aware of the mobility of the attached mobile relay node 3 and therefore it does not need to configure handover related measurements at all.

Autonomous Handover by Proximity Indication

Sixth Embodiment

Figure 9:
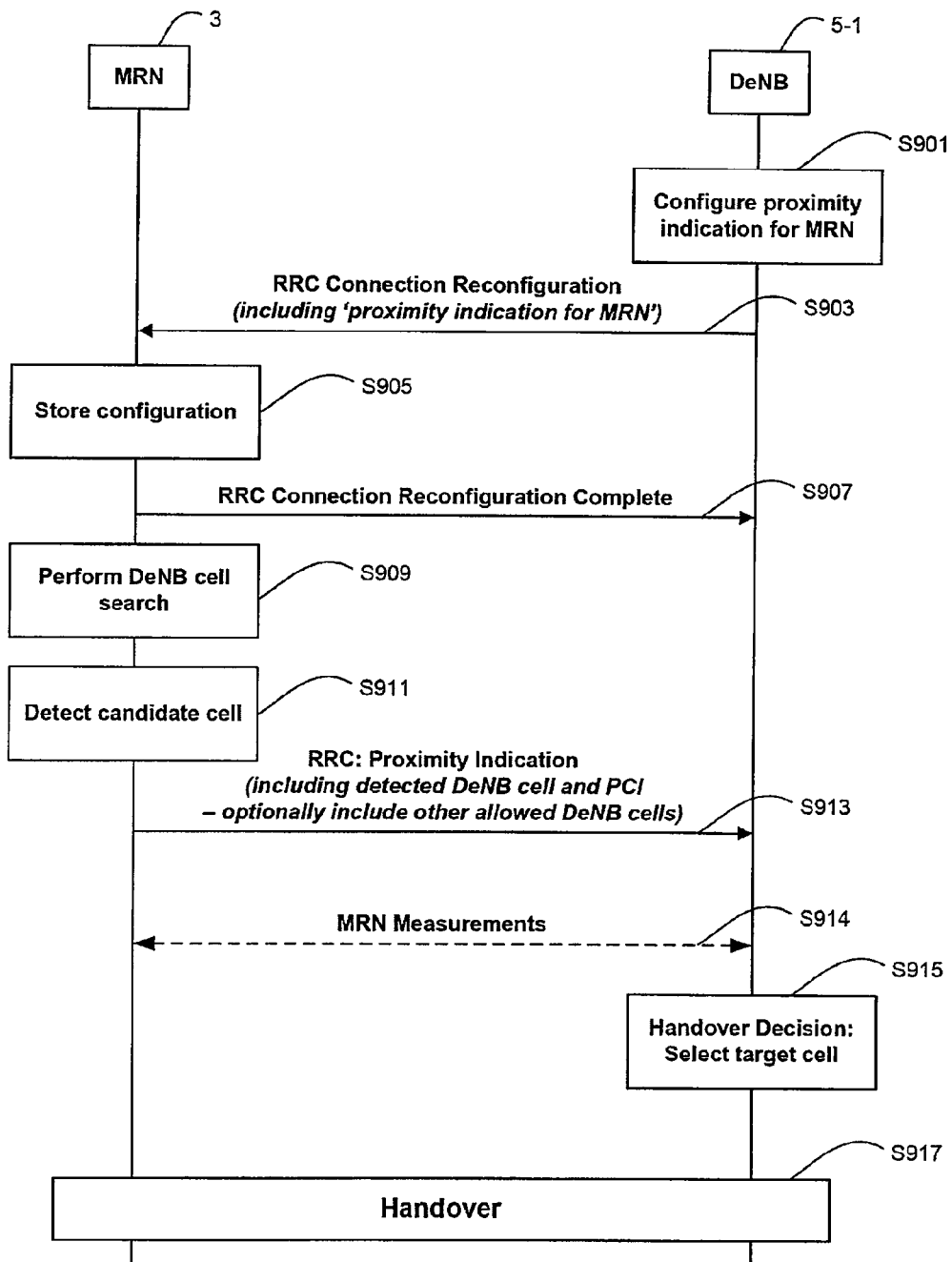
FIG. 9 shows an example timing diagram illustrating a method performed by components of the communication system using a proximity indication procedure.

FIG. 9 shows an example timing diagram illustrating a method performed by components of the communication system 1 using a proximity indication procedure.

In 3GPP Release 10 the 'Proximity Indication' procedure is defined in the TS 36.331 standard and is used to indicate that the UE is entering or leaving the proximity of one or more cells having a pre-defined group of which the UE is a member (e.g. a closed subscriber group (CSG)). The detection of proximity is based on an autonomous search function as defined in TS 36.304, the contents of which are hereby incorporated by reference.

In this example, the Proximity Indication functionality is extended for MRN use, i.e. to indicate that the mobile relay node 3 is entering or leaving the proximity of a base station that is capable of providing donor services.

Initially, in step s901, the relay node handover module 67 of the donor base station 5-1 configures the proximity indication parameters for the mobile relay node 3. This may be performed, e.g. during start-up or attachment of the mobile relay node 3 to the donor base station 5-1.

Therefore, in step s903, the serving donor base station 5-1 generates and sends an 'RRC Connection Reconfiguration' message to the mobile relay node 3, and includes in this message a 'Proximity Indication' IE (e.g. 'proximityIndicationEUTRA-RN' IE) which contains the proximity indication configuration. This message effectively instructs the mobile relay node 3 to search for other base stations and/or cells thereof having a 'closed subscriber group' that the MRN is a member of. The cells having a 'CSG' of which the MRN is a member are limited to donor capable cells operated by a donor capable base station. The search is based on a list, stored in the MRN, comprising information identifying the cells having a CSG of which the MRN is a member (and thus identifying the cells operated by a base station that is capable of providing donor services). In this way, base stations that are capable of providing donor services are treated as having a 'closed subscriber group' to which the mobile relay node 3 belongs. In step s905, the mobile relay node 3 stores in its memory 39 the received proximity indication configuration and, using its measurement and reporting module 47, starts monitoring whether or not a condition defined therein is met.

Next, in step s907, the mobile relay node 3 confirms that the reconfiguration has been successful by generating and sending an 'RRC Connection Reconfiguration Complete' message to the donor base station 5-1.

Subsequently, in step s909, the mobile relay node 3 autonomously searches for donor base station cells. The search mechanism may be based on the mobile relay node's current location (obtained e.g. using the positioning module 48) or cell measurement (obtained e.g. using the measurement and reporting module 47), and may be limited to the allowed DeNB cells only (if the list 10 of allowed donor base stations is available) and/or to donor base stations located along the expected route of the mobile relay node 3. This step may be performed only once, or continuously, or periodically, as defined in the received 'proximityIndicationEUTRA-RN' IE.

In step s911, the mobile relay node 3 detects a candidate cell which matches the configured proximity indication criteria, i.e. a cell of which the MRN is a member and therefore in which donor services are available.

Therefore, in step s913, the mobile relay node 3 generates and sends an 'RRC Proximity Indication' message to the donor base station 5-1, and includes in this message (e.g. in an information element) an identification (e.g. physical cell identifier (PCI)) of the detected cell (and any further cells) to which the mobile relay node 3 can be handed over.

Optionally, in step s914, the donor base station 5-1 (e.g. using its relay node handover module 67) may request the mobile relay node 3 to carry out further measurements (e.g. using its measurement and reporting module 47 and/or its positioning module 48), in order to further assist its handover decision. However, the relay node handover module 67 may trigger handover based on the proximity indication alone.

In step s915, the relay node handover module 67 makes a handover decision and selects a target cell indicated in the proximity indication and therefore a donor capable cell of a donor capable base station (e.g. Cell 2 of base station 5-2) for the mobile relay node 3, using the information received in step s913 (and/or in optional step s914).

Finally, in step s917, the donor base station 5-1 and the mobile relay node 3 perform the handover procedures to the target cell, i.e. the mobile relay node 3 detaches from base station 5-1 and re-attaches to the new donor base station (e.g. donor base station 5-2) associated with the cell selected in step s915.

Route Information Held by Donor Base Station

Seventh Embodiment

Figure 10:
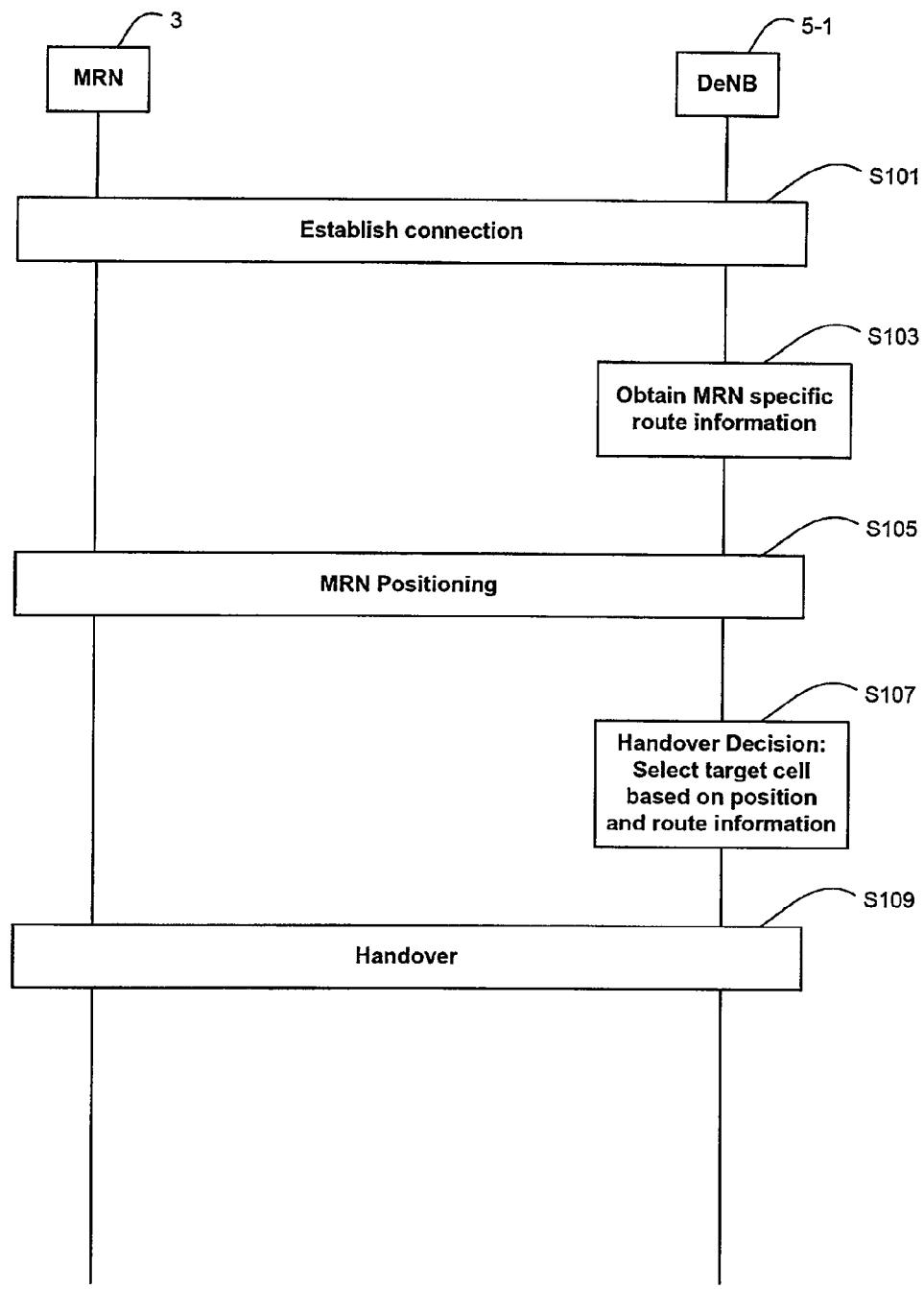
FIG. 10 shows an example timing diagram illustrating a method performed by components of the communication system when performing handover based on route information and positioning measurements.

FIG. 10 shows an example timing diagram illustrating a method performed by components of the communication system 1 when performing handover based on route information and positioning measurements.

In this example, the donor base station 5-1 obtains MRN specific route information and monitors the current location of the mobile relay node 3. When the donor base station 5-1 determines that the mobile relay node 3 has reached a location (or area) which is identified as a handover location in the MRN specific route information, the donor base station 5-1 triggers handover for the relay node 3 towards a target cell.

Initially, in step s101, the mobile relay node 3 and the donor base station 5-1 establish a connection, and in step s103, the donor base station 5-1 obtains (e.g. using its operation and maintenance module 69) and stores in its memory 59 MRN specific route information. The route information includes pre-determined MRN handover information (such as geographic coordinates, next allowed MRN cell, and the like).

Since mobile, e.g. train-mounted, relay nodes often use a known route, the relay node handover module 67 can determine an optimal handover location and target DeNB cell using the route information obtained above and the current geographic location of the mobile relay node 3.

Therefore, in step s105, the positioning module 68 obtains location information (e.g. geographical position, velocity, direction of travel, and the like) relating to the mobile relay node 3. The location information may be obtained e.g. using the Location Request services (LCS) as defined in the 3GPP TS 23.271 standard, the contents of which are hereby incorporated by reference. Optionally, step s105 may generally follow the procedures described above with reference to steps s603 to 613 of FIG. 6.

Subsequently, in step s107, the relay node handover module 67 makes a handover decision and selects a target cell for the mobile relay node 3. In this step, the relay node handover module 67 uses the obtained location information, information identifying cells/base stations that are capable of providing donor services, and the pre-determined route information to trigger a handover for the mobile relay node 3 to a donor capable cell when the MRN enters that cells coverage.

Finally, in step s109, the donor base station 5-1 and the mobile relay node 3 perform handover procedures, i.e. the mobile relay node 3 detaches from base station 5-1 and re-attaches to the new donor base station selected in step s107.

In this method the mobile relay node 3 does not need to obtain and process route information. Only location calculation is required. This advantageously reduces the complexity of the mobile relay node 3 and also reduces the number of measurements required thus minimising handover delay.

Eighth Embodiment

Figure 11:
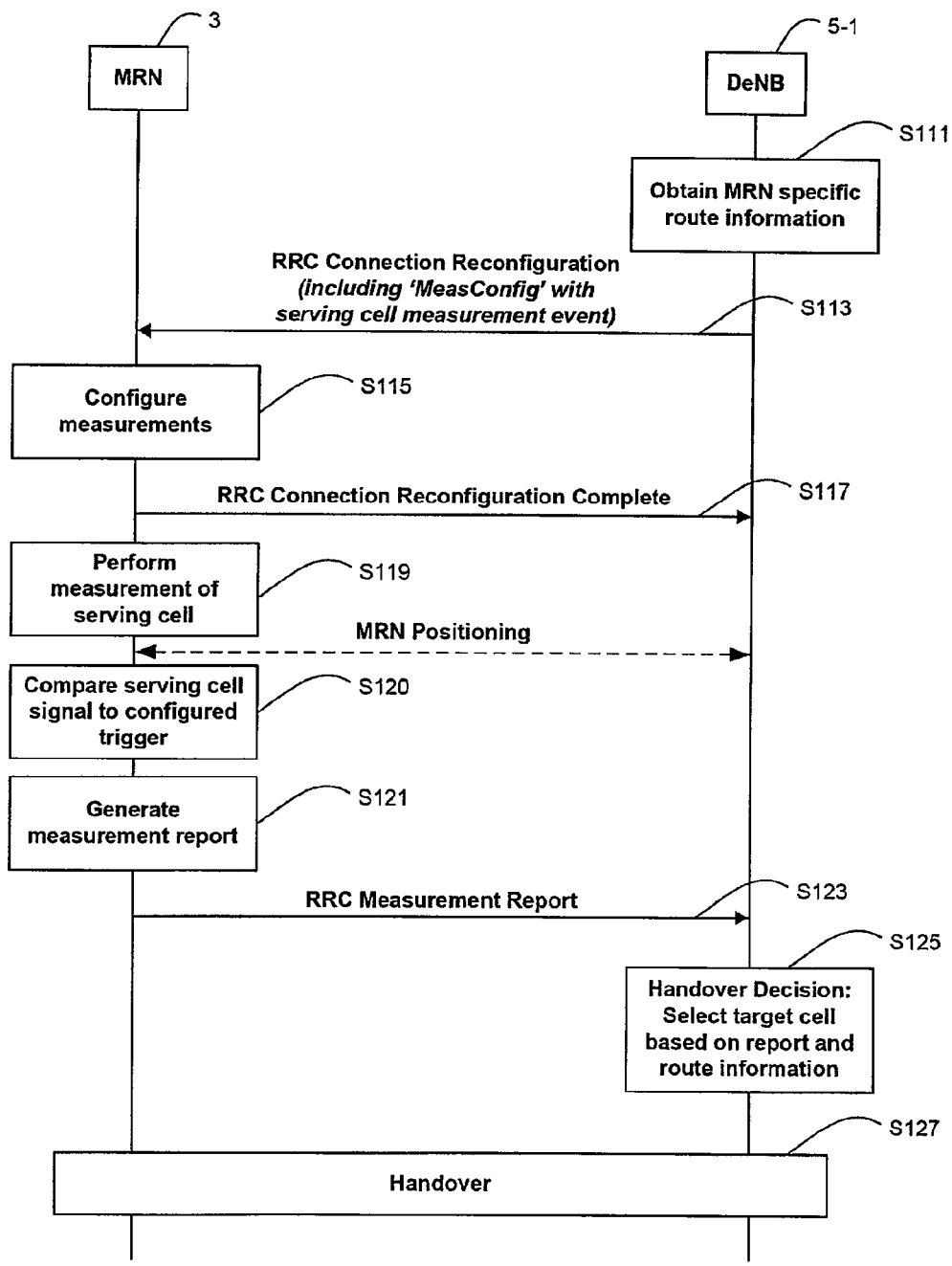
FIG. 11 shows another example timing diagram illustrating a method performed by components of the communication system when configuring and performing handover related measurements and reporting, using route information and measurement of the serving cell.

FIG. 11 shows another example timing diagram illustrating a method performed by components of the communication system 1 when configuring and performing handover related measurements and reporting, using route information and measurement of the serving cell.

In this example, the donor base station 5-1 configures serving cell measurements for the mobile relay node 3, similar to the embodiment described above with reference to FIG. 7. However, in this embodiment, the donor base station 5-1 obtains MRN specific route information thus the mobile relay node 3 does not need to indicate any handover candidate cells.

Initially, the donor base station 5-1 obtains, in step s111, MRN specific route information (e.g. from the OAM 11). The route information includes pre-determined MRN handover information (such as geographic coordinates, list of donor capable base stations along the route, sequence of cells that the MRN is configured to use, and/or the like).

Steps s113 to s121 of this method generally follow the procedure described with reference to steps s703 to s711 of FIG. 7, respectively. However, in step s123, the measurement and reporting module 47 reports only the results of the serving cell measurements.

In step s125, the relay node handover module 67 makes a handover decision and selects a target cell (e.g. Cell 2 of base station 5-2) for the mobile relay node 3, using the measurement results received in step s123 and the MRN specific route information obtained in step s111.

For example, the relay node handover module 67 may use serving cell information and a history of previous serving cells (or previous donor base stations) when selecting the target cell. The cell/DeNB history enables the relay node handover module 67 to compare the current cell/DeNB against a pre-determined order of cells/DeNBs for the mobile relay node 3.

When selecting a target cell, the relay node handover module 67 may also use serving cell information in combination with location information (e.g. geographical position, velocity, direction of travel, and the like) obtained via the positioning module 68. In this case the relay node handover module 67 may compare the current cell/DeNB against a pre-determined order of cells/DeNBs (with location info) for identifying the next donor cell. Therefore, in addition to (or instead of) steps s119 to s123, the donor base station 5-1 and the mobile relay node 3 may carry out positioning procedures as described above at step s105.

In either case, the handover decision, at step s125, is based on information identifying a target cell that is capable of providing donor services. After a target donor capable cell has been selected for the mobile relay node 3, the serving donor base station 5-1 and the mobile relay node 3 perform handover procedures, at step s127.

This method ensures that when the signal strength of the current cell falls below a pre-defined threshold, the mobile relay node 3 is handed over to the next donor capable base station which is selected based on the mobile relay node's known route. In this case, there is no need for the mobile relay node 3 to obtain and process route information, thus advantageously reducing the complexity of the mobile relay node 3.

Modifications and Alternatives

Detailed embodiments have been described above. As those skilled in the art will appreciate, a number of modifications and alternatives can be made to the above embodiments whilst still benefiting from the inventions embodied therein.

Although in FIG. 4 it is shown that the relay node handover module performs filtering of cells after it has received the results of the mobile relay node's measurements, it will be appreciated that the relay node handover module may filter the cells before configuring the measurements for the mobile relay node, i.e. before the donor base station generates and sends an 'RRC Connection Reconfiguration' message at step s403. Since in this case only those cells will be configured for measurement that belong to base stations on the list of allowed donor base stations, the mobile relay node's measurement and reporting module will not need to measure or report any cells that are not suitable handover candidates. Therefore, step s414 can be omitted (i.e. the relay node handover module performs a similar filtering before step s403). This beneficially provides a further benefit that the measurement and reporting module needs to carry out fewer measurements and only with respect to those donor base stations that represent a valid handover candidate for the mobile relay node. This modification significantly reduces the signalling required between the donor base station and the mobile relay node.

Therefore, in the example system shown in FIG. 1, the donor base station may instruct the mobile relay node to measure only donor base station 5-2 for handover triggering. This advantageously prevents the mobile relay node form measuring other neighbour base stations, such as base station 5-3, which do not provide donor base station services (for this mobile relay node). Therefore, even if the signal quality in Cell 3 (operated by base station 5-3) is likely to be better than in Cell 2 (operated by donor base station 5-2), because base station 5-3 is not a suitable candidate for handing over this MRN, unnecessary measurements and reporting do not need to be performed by the measurement and reporting module.

Although in FIG. 5 it is shown that the mobile relay node performs filtering of candidate cells after the measurement results have been obtained (i.e. in step s512), it will be appreciated that the mobile relay node may filter the candidate cells even before carrying out the measurements. Since in this case only those cells will be measured which belong to base stations on the list of allowed donor base stations, the measurement and reporting module will not measure or report any cells that are not suitable handover candidates. Therefore, step s512 can be omitted (i.e. the mobile relay node performs a similar filtering before step s509).

As shown in FIG. 5, the list of allowed donor base stations may be configured and stored in the mobile relay node. Preferably, the mobile relay node obtains the list from the OAM entity or from a base station. In this case, instead of or in addition to a list maintained by the donor base station, the mobile relay node may filter (at step s512) the cell measurements based on its own list. For example, the mobile relay node (i.e. its measurement and reporting module) may perform cell measurements with respect to those base stations only that are included in its list of allowed donor base stations even if the received configuration parameters specify measurement of a different set of base stations. Optionally, the mobile relay node may perform cell measurements with respect to all base stations specified by the donor base station but report only those cells that belong to base stations on the list of the mobile relay node's allowed donor base stations.

According to a further modification of this alternative, the donor base station may store a network specific list of donor base stations, and the mobile relay node may store a mobile relay node specific list of allowed base stations, which might be different, e.g. a subset of the donor base station's list. The lists might be configured and stored in the mobile relay node and/or the base station via the OAM entity or via one of the base stations (e.g. using the X2 interface, or by using RRC signalling).

In the above description, the donor base station and/or the mobile relay node obtains the list of allowed donor base stations from the OAM entity. However, it will be appreciated that the donor base station may obtain this list from another base station (e.g. a previous donor base station serving the same mobile relay node) or from a plurality of base stations via the X2 interface. When base stations exchange cell information with each other over the X2 interface, they may include an additional indication (e.g. an 'MRN Handover Allowed' IE) with the information for each of their cells. The indication may be included, for example, in either one of the 'X2 SETUP REQUEST', 'X2 SETUP RESPONSE', and 'ENB CONFIGURATION UPDATE' messages. In this case, initially each donor base station is configured, e.g. via the OAM entity, with a list of allowed donor base station that consists of only that base station only. However, after exchanging X2 messages with the other base stations, the donor base stations may expand the initial list and add further allowed donor base stations thus generating a complete, up-to-date list of allowed donor base stations over time.

Alternatively, the donor base station and/or the mobile relay node may obtain the list of allowed donor base stations using RRC signalling or using a combination of the above alternatives.

In the above embodiments, the list of allowed donor base stations is described to be either network specific or mobile relay node specific. However, it will be appreciated that different types of lists or sub-lists may be provided, e.g. a list based on a current or historical geographic location, a list based on a time parameter, or any combination thereof. For example, the list of allowed donor base stations may comprise donor base stations per predefined region, such as a country, a city, or a route previously taken by the mobile relay node. Furthermore, the list of allowed donor base stations may be further narrowed based on, e.g. the current cell in which the mobile relay node is located. In this case, the list of allowed donor base stations may depend on the direction of travel as well, such that the mobile relay node measures or reports only neighbour base stations or base stations that are located along the path to be taken (or that has been taken previously) by the mobile relay node. This alternative further limits the cells to be considered by the donor base station at handover and reduces the size of the list of allowed donor base stations, which may be quite large for a long train route.

In a particular example, only one cell, i.e. the cell that belongs to a base station that is expected to be the next point of attachment for the mobile relay node is measured and/or reported by the mobile relay node. As a variation of this alternative, instead of the next cell, only the current cell is measured and when the signal level falls below a pre-defined threshold, handover is triggered to a cell that belongs to a base station that is expected to be the next point of attachment for the mobile relay node (e.g. based on stored route information). The benefit of this solution is that the mobile relay node can measure the current cell more reliably than neighbour cells and therefore it is less prone to error and delay. This measurement may be provided as a new event type, e.g. "RN handover required based on serving cell below a threshold" or as a modification of an existing event type (e.g. Event A2).

The list of allowed donor base stations may also be provided based on a current velocity of the mobile relay node, such that cells covering a relatively small geographic area (which can be traversed in a relatively short period of time) are discarded for the measurements and/or for handover decision in favour of relatively large cells. This alternative advantageously prevents the mobile relay node from performing frequent handovers.

In the embodiment described with reference to FIG. 6, the MRN specific route information is described to be downloaded by the mobile relay node from the OAM entity. It will be appreciated however that the route information may be downloaded from (or via) one of the base stations as well. In this case, the mobile relay node uses the route information to narrow down the measurements configured by the donor base station (which might already take into account e.g. the list of allowed donor base stations). This option may be advantageously combined with any of the list based embodiments described with reference to FIGS. 4 and 5 such that the measurements and/or reporting and/or selection of the handover target cell takes into account both the list of allowed donor base stations and the route information obtained by the mobile relay node. Moreover, the MRN specific route information may be obtained by the donor base station as well, which then uses the route information for configuring the mobile relay node's measurements.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the above description, the donor base station and the mobile relay node are described, for ease of understanding, as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Whilst the signalling messages described herein that include the measurement results and/or proximity indication and/or cell information are advantageous in terms of simplicity, ease of implementation and minimising the number of messages required, this information may be sent in any of a number of different ways, e.g. in multiple messages. Moreover, instead of modifying the described signalling messages, completely new messages may be generated which include the measurement results and/or proximity indication and/or cell information.

In the embodiments described above, the mobile relay node and the base station will include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

INTRODUCTION

Relay Nodes (RNs) were introduced in 3GPP Release 10 [5]. A RN is basically an eNB where the backhaul is provided wirelessly via a connection to an eNB serving the RN, called a Donor eNB (DeNB).

In 3GPP Release 10 the RNs were considered static, i.e. inter-cell handover of the RN was not supported. Mobile relay is now being considered through a study item in 3GPP Release 11 [1]. If a RN becomes mobile then inter-cell handover of the RN will be required.

The purpose of this document is to discuss the triggers for inter-cell handover of a Mobile Relay Node (MRN).
Discussion
Problem:
 How will MRN handover between DeNB cells be triggered?
 Using the same method as a UE, i.e. neighbour cell measurements, may not be appropriate because:
  The Mobile Relay 3GPP Release 11 study item is focused specifically on the high speed train scenario, e.g. mounting RNs on train carriages.
  This means the MRN may be operating in a very high-speed environment where measurements are less accurate
  Measurements take time to perform and any time delay may be critical in a high-speed environment
  Train-mounted MRNs use a known route. It is unnecessary to measure all cells when the next target DeNB cell, and approximate location of handover, can be known in advance.
  Existing UE measurements don't distinguish between DeNB cells and non-DeNB cells. If a measurement event is triggered by the MRN for a non-DeNB cell, then the measurement event may be irrelevant for MRN handover purposes.
   For e.g. Event A5 (PCell becomes worse than threshold1 and neighbour becomes better than threshold2) may be triggered by any neighbour cell. If that neighbour cell is not an allowed DeNB cell then the event is not a useful trigger for MRN handover.
 Any handover mechanism for a MRN must be robust due to the increased likelihood of handover failure (i.e. due to the high speed of the MRN and also that some neighbour cells will not be allowed DeNB cells) and the consequences of handover failure, i.e. the potentially large number of UEs that would be affected.
Possible Solutions:
 The following possible solutions are considered in this document:
 Solution 1: MRN performs the same intra/inter-frequency measurements as a UE
  Method 1.1: The DeNB must perform the filtering of reported cells against the allowed DeNB cell list.
   Method 1.1.1: The allowed DeNB cell list is available to the DeNB via O&M.
   Method 1.1.2: The allowed DeNB cell list is available to the DeNB via X2
 Solution 2: MRN performs the same intra/inter-frequency measurements as a UE but with some relay-specific enhancement
  Method 2.1: MRNs only trigger measurement events based on allowed DeNB cells
 Solution 3: A new relay-specific Measurement Event is introduced
  Method 3.1: A new relay-specific location based measurement event is introduced
  Method 3.2: A serving cell based measurement event is created for MRN use
   Method 3.2.1: A new relay-specific serving cell based measurement event is introduced
   Method 3.2.2: An existing serving cell based measurement event is modified for MRN use
 Solution 4: MRN requests handover using an RRC message
  Method 4.1: MRN autonomously requests handover using a new relay-specific RRC message
   Method 4.1.1: MRN triggers handover based on own location and pre-determined route information.
   Method 4.1.2: MRN triggers handover based on serving cell measurements and pre-determined route information
  Method 4.2: MRN uses the existing 'proximity indication' procedure with some modification for relaying
 Solution 5: DeNB uses pre-determined route information to trigger handover
  Method 5.1: DeNB uses location services and pre-determined route information to trigger handover Method 5.2: DeNB uses existing serving cell measurements and pre-determined route information to trigger handover Detailed description of the potential solutions and methods are described below.

Solution 1: MRN Performs the Same Intra/Inter-Frequency Measurements as a UE

Figure 12:
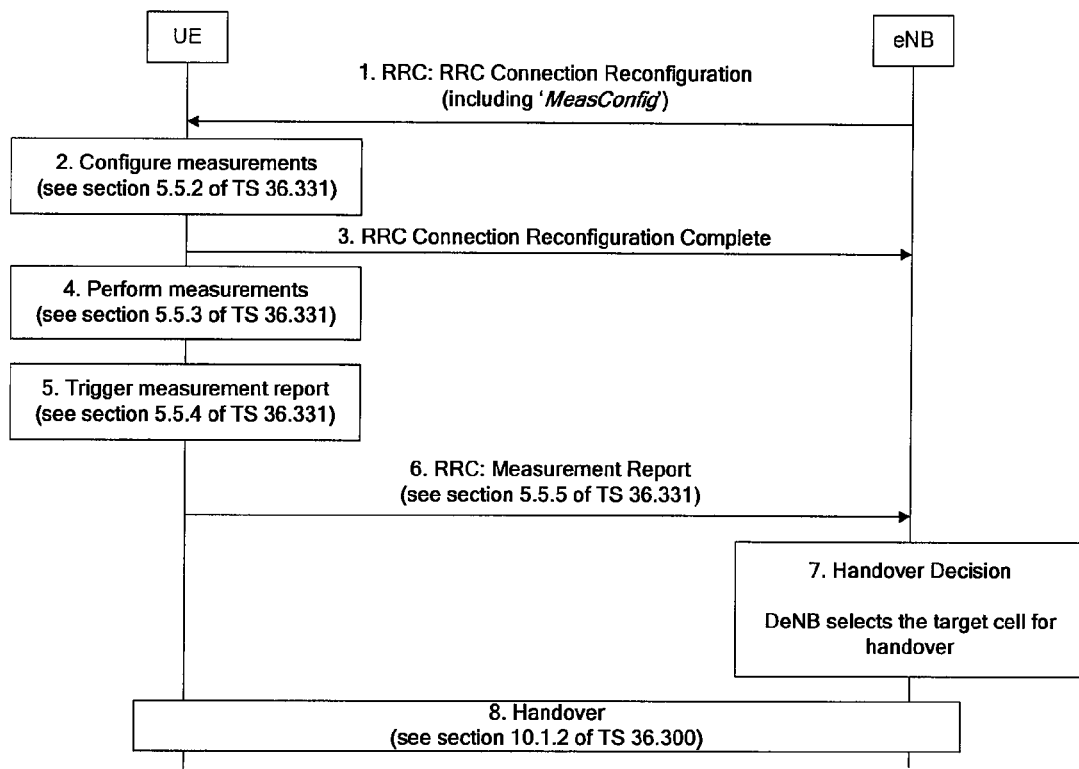
FIG. 12 shows existing message sequence for HO triggering, including measurements.

The existing overall mobility sequence, for a normal UE, is described in section 10.1.2 of TS36.300 [5]. The following sequence focuses on the start of that sequence, i.e. the configuration of measurements by the eNB and the subsequent triggering of handover. See FIG. 12.

For this solution, the existing UE measurement procedures and signalling are reused by MRN and DeNB without modification, i.e.

DeNB can ask the MRN to perform the same measurements as a UE, e.g. event A5, using the same signalling and procedure.

MRN performs measurements in the same way as existing for UEs. Measurement events are also triggered as existing, i.e. MRN does not cross check the cells against the allowed DeNB cells list Handover can be triggered based on neighbour cell measurements, all cells used to trigger measurement events However, the problems listed at the start of this document are not addressed. Additionally, this solution would require measurement gaps for the MRN to perform inter-frequency measurements.

A specific issue that would need to be addressed for this solution is that the DeNB should not trigger handover towards a non-allowed DeNB cell.

Methods to ensure the DeNB does not trigger handover to a non-allowed DeNB cell are:

Method 1.1: The DeNB must perform the filtering of reported cells against the allowed DeNB cell list.

Figure 13:
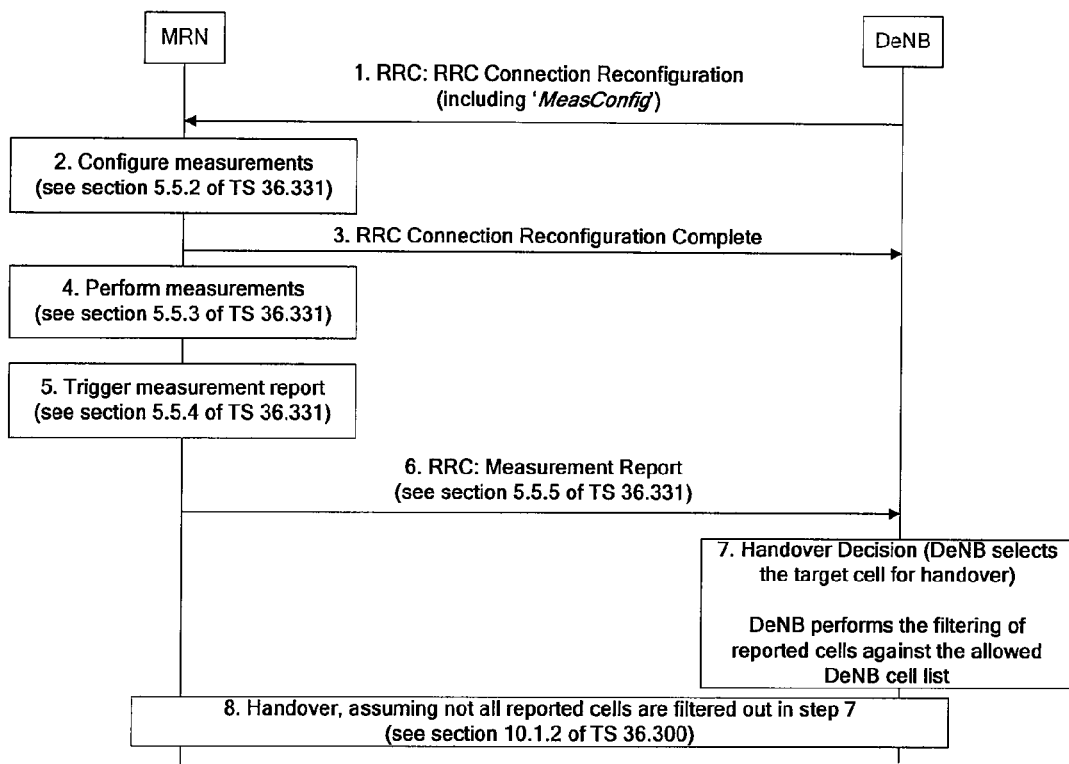
FIG. 13 shows Method 1.1: Message sequence for HO triggering, including measurements.

The filtering is performed upon reception of RRC: Measurement Report. See FIG. 13.

In 3GPP Release 10 the DeNB is not specified to have allowed/non-allowed DeNB cell information, but this would be required for this solution.

Methods to achieve this are:

Method 1.1.1: The allowed DeNB cell list is available to the DeNB via O&M.

This information (e.g. allowed DeNB cell list) may be downloaded from O&M by the DeNB when it is serving a MRN.

Since the existing allowed DeNB cell list can be RN specific (in Rel' 10 it is downloaded from RN O&M), the DeNB must either:

Have access to RN specific O&M, or

RN specific information must be available in DeNB O&M, or

Allowed DeNB cell lists are not allowed to be RN specific

Method 1.1.2: The allowed DeNB cell list is available to the DeNB via X2

When cell information is exchanged over X2, e.g. in the messages X2 SETUP REQUEST, X2 SETUP RESPONSE, ENB CONFIGURATION UPDATE, an additional indicator (e.g. 'MRN Handover Allowed' IE) is added to the information for each cell.

Figure 14:
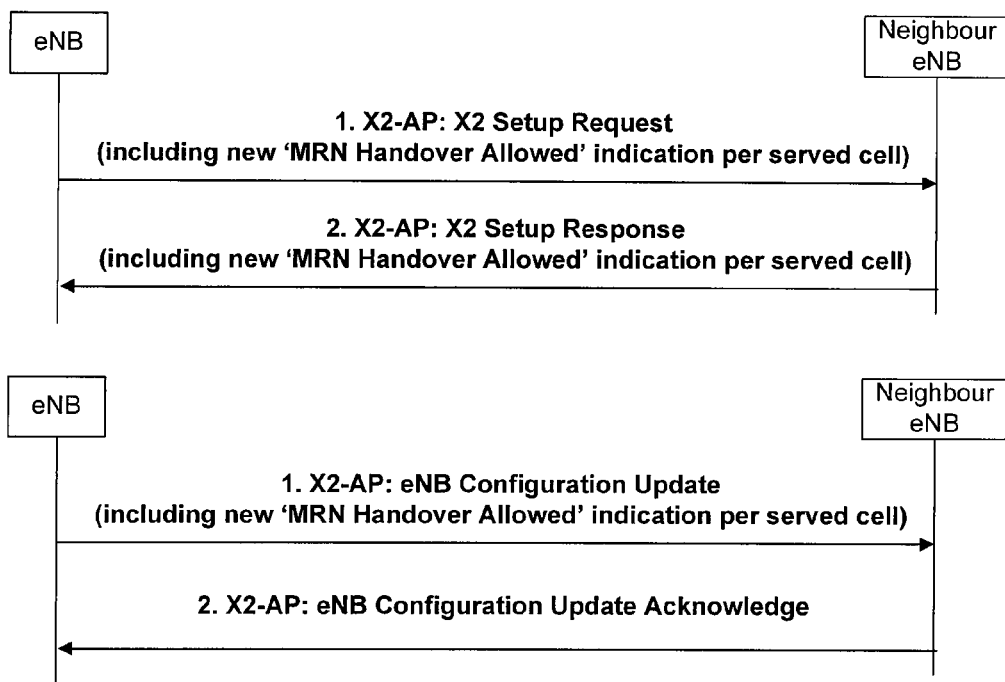
FIG. 14 shows Method 1.1.2: Allowed DeNB cell list information exchanged via X2.

This is shown in the following message sequences (based on TS 36.423 [6] sections 8.3.3 and 8.3.5). See FIG. 14.

This information would be network wide, i.e. not RN specific. RN specific details would be dealt with as described in method 1.1.1.

Solution 2: MRN Performs the Same Intra/Inter-Frequency Measurements as a UE but with Some Relay-Specific Enhancement For this solution, the existing UE measurement procedures and signalling are reused with some relay specific modification:

Method 2.1: MRNs only trigger measurement events based on allowed DeNB cells

This method avoids measurement events being triggered by irrelevant cells.

DeNB can ask the MRN to perform the same measurements as a UE, e.g. event A5, using the same signalling and procedure.

The 'allowed DeNB cells' is available to the RN from RN O&M. This is downloaded at RN start-up and is already standardised in Rel' 10.

In the measurement procedure, the MRN will only consider the 'allowed DeNB cells' (e.g. as downloaded from O&M) when determining if the measurement event triggering conditions are met as described in section 5.5.4.1 of TS36.331 [3].

For e.g. Event A5 (PCell becomes worse than threshold1 and neighbour becomes better than threshold2) may be triggered by any neighbour cell. If that neighbour cell is guaranteed to be an allowed DeNB cell then the event can be used as a meaningful trigger for MRN handover.

This method can optionally be further enhanced by:

Restricting the MRN to only include 'allowed DeNB cells' within the reported measured results of the measurement report. Although the measurement report is triggered based on an allowed DeNB cell, the DeNB is not required to select that cell for the handover, e.g. it may look at other cells in the measurement report. By limiting all cells in the measurement report to only allowed DeNB cells, this would inform the DeNB of the full pool of allowed DeNB cells it may choose as the HO target.

Enhancing the existing 'allowed DeNB cells' list. An example is, for each allowed DeNB cell, to include the next allowed target DeNB cell(s). This further limits the cells to be considered by the DeNB at HO which may be helpful because the 'allowed DeNB cells' list may be quite large for a long train route.

Figure 15:
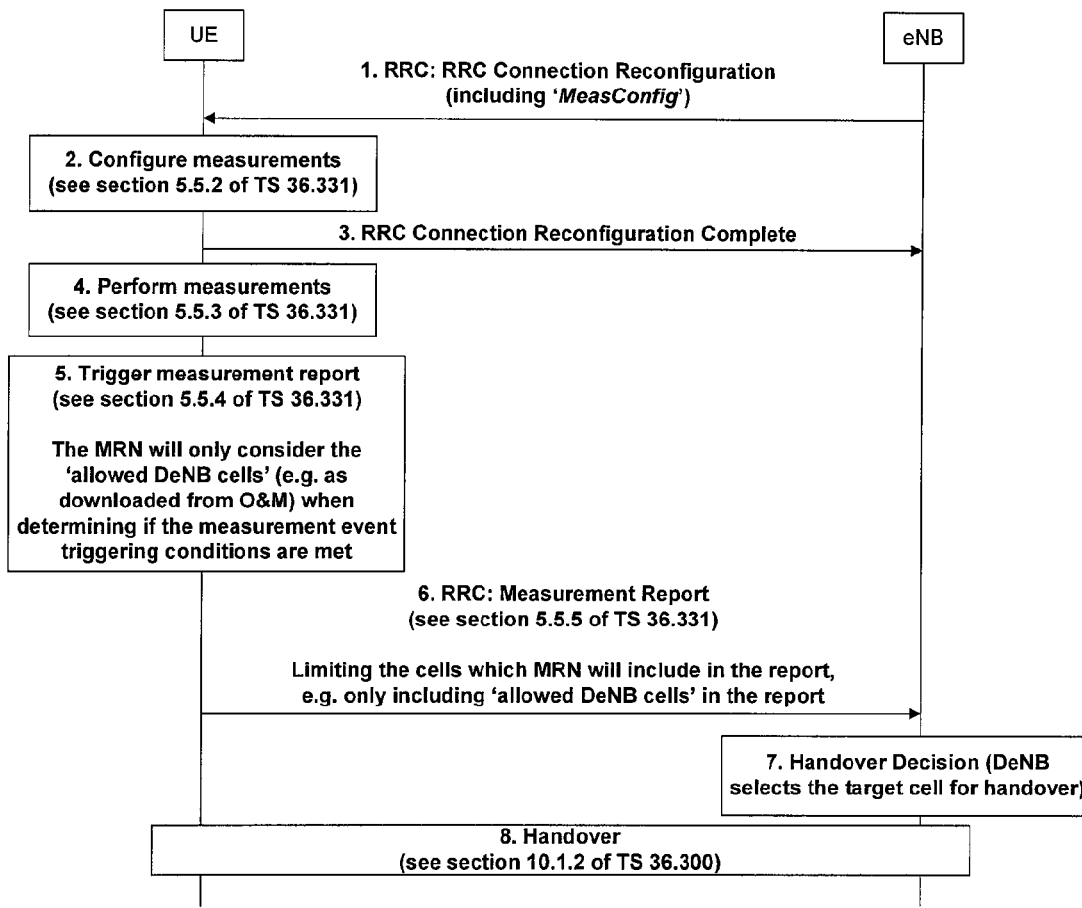
FIG. 15 shows Method 2.1: Message sequence for HO triggering, including measurements.

This solution would require measurement gaps for the MRN to perform inter-frequency measurements. See FIG. 15.

Solution 3: A Measurement Event is Created or Modified for Relay-Specific Use

This solution makes use of the fact that train-mounted MRNs use a known route therefore the next target DeNB cell can be pre-determined.

Method 3.1: A new relay-specific location based measurement event is introduced

MRN triggers handover based on own location and pre-determined route information.

In this method only location calculation is required. Fewer measurements are performed so less handover delay.

In this method the DeNB can configure a new event, e.g. "RN handover required based on location" in the MRN using the existing RRC measurement handling signalling and procedures. The measurement configuration may contain details of the positioning required, e.g. location accuracy.

In this method the MRN can perform/request its own location calculation, e.g. using A-GPS, and compare this to the pre-determined handover information to decide when handover is required.

In 3GPP Release 10 the MRN is not currently specified to have access to any pre-determined MRN handover information. For this method, pre-determined MRN handover information (such as geographic coordinates, next allowed MRN cell) should be available to the MRN, e.g. alongside the download of allowed DeNB cells at RN start-up.

Figure 16:
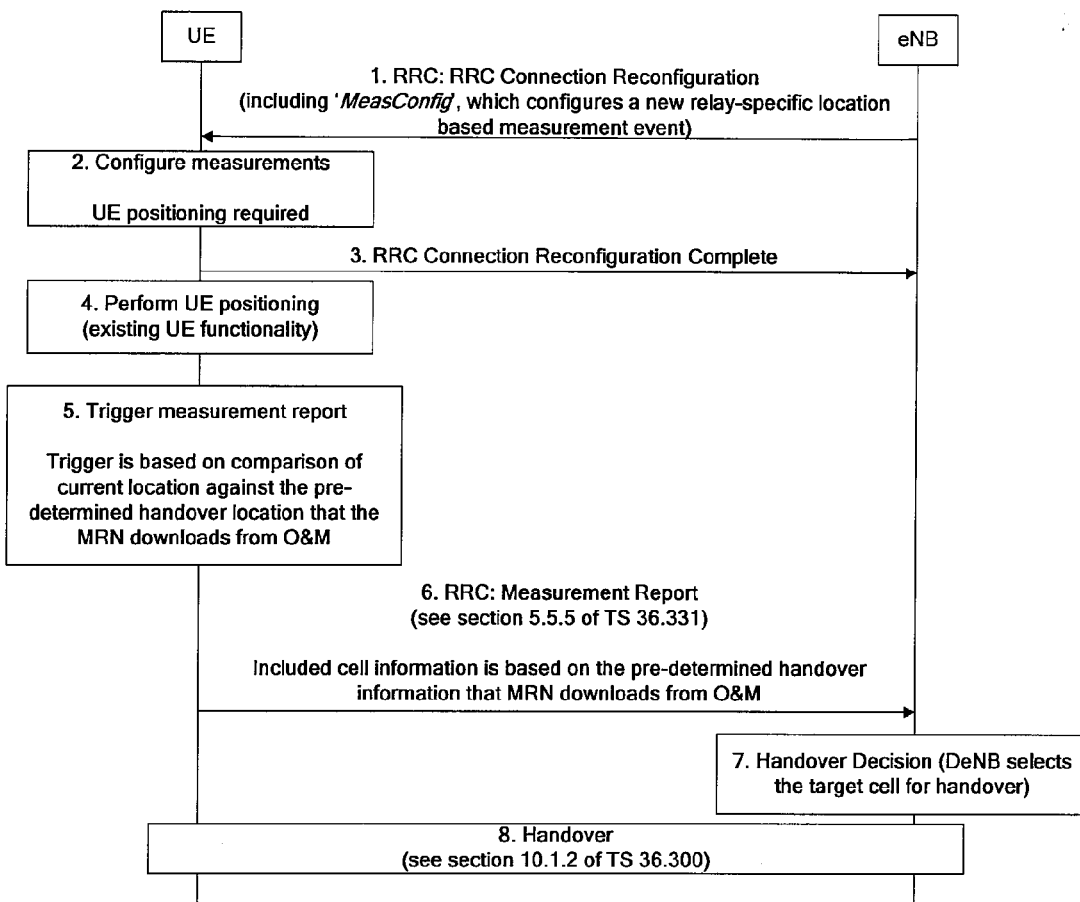
FIG. 16 shows Method 3.1: Message sequence for HO triggering, including measurements.

The measurement report sent by the MRN can indicate the allowed target DeNB cell which triggered the measurement event and optionally any other allowed target DeNB cells. See FIG. 16.

Method 3.2: A serving cell based measurement event is used to trigger handover

In this method only the serving DeNB cell is measured. This is easier to measure than neighbour cells and therefore less prone to error and delay.

The DeNB can request the MRN to configure a measurement event to report when the serving cell drops below a threshold.

This event can be either a new measurement event, e.g. "RN handover required based on serving cell below a threshold" created for this purpose or the existing Measurement Event A2 could be modified for this purpose.

The new or modified event can be configured using the existing RRC measurement handling signalling and procedures.

When the event is triggered, the MRN then uses the pre-determined route information to select the next target DeNB cell. The MRN does not currently have this information. It could be downloaded from O&M by the RN alongside the download of allowed DeNB cells at RN start-up.

The measurement report sent by the MRN can indicate the allowed target DeNB cell which triggered the measurement event and optionally any others allowed target DeNB cells.

The way the MRN selects the next target DeNB cell depends upon the information it has available about its own movement:

Serving DeNB cell information and previous serving DeNB cell history

The DeNB cell history would enable the MRN to compare against the pre-determined order of DeNB cells to determine the next DeNB cell. UE History Information IE is not available to the MRN so the MRN would need to keep this information itself.

Serving DeNB cell information and location information

The MRN would need to be aware of its detailed location or just some indication of its position, e.g. direction of travel.

Figure 17:
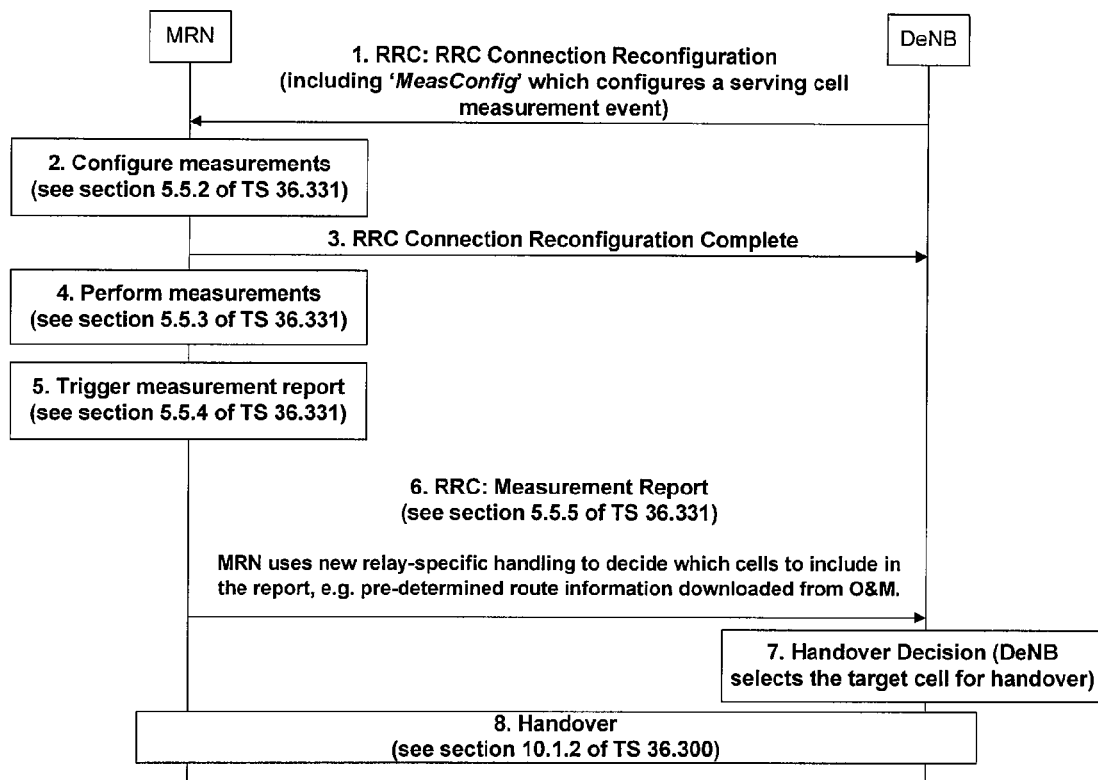
FIG. 17 shows Method 3.2: Message sequence for HO triggering, including measurements.

The MRN can then compare against the pre-determined DeNB cell information (with location info) to determine the next DeNB cell. See FIG. 17.

Solution 4: MRN Requests Handover Using an RRC Message

Method 4.1: MRN autonomously requests handover using a new relay-specific RRC message This solution is similar to solution 3 but instead of requiring configuration by the DeNB the MRN will autonomously check for a handover trigger condition.

A new RRC message from MRN to DeNB, e.g. RRC: RN HANDOVER REQUIRED, is created specifically to inform the DeNB that a handover is required for this relay node.

This new message can indicate the allowed target DeNB cell which triggered the handover and optionally any others allowed target DeNB cells. As with solution 3, the handover could be triggered based on the following:

Method 4.1.1: MRN triggers handover based on own location and pre-determined route information.

Figure 18:
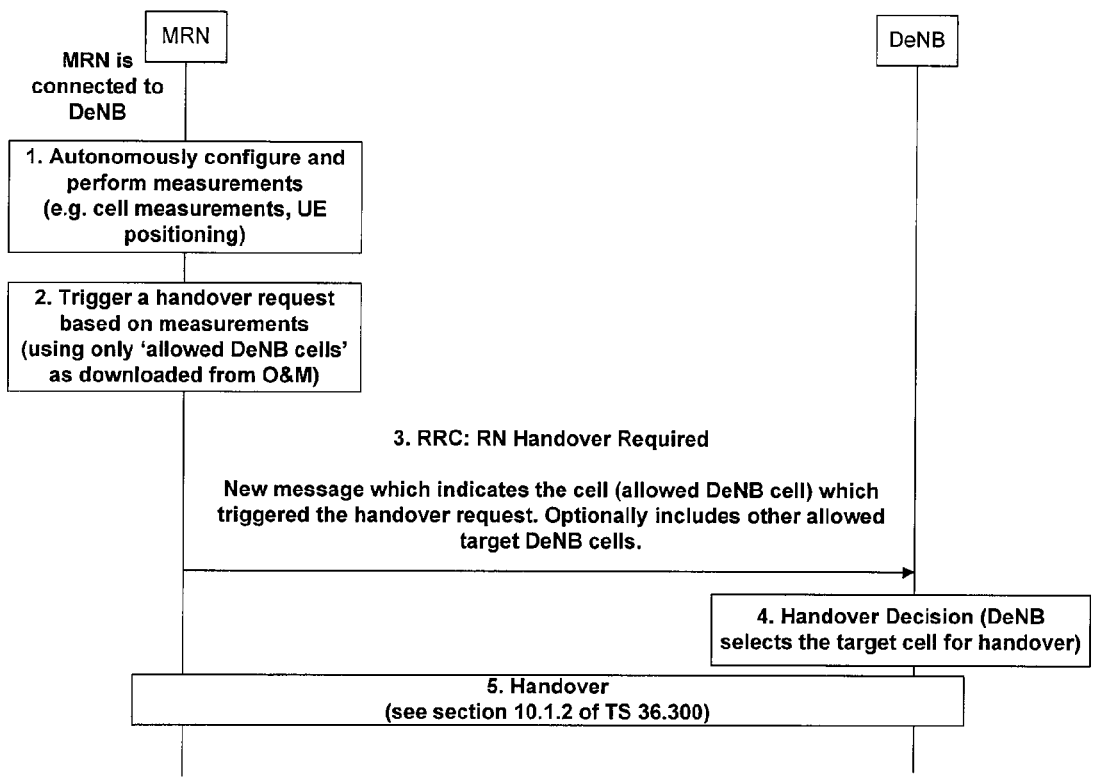
FIG. 18 shows Method 4.1: Message sequence for HO triggering, including measurements.

Method 4.1.2: MRN triggers handover based on serving cell measurements and pre-determined route information. See FIG. 18.

Method 4.2: MRN Uses the Existing 'Proximity Indication' Procedure with Some Modification for Relaying In 3GPP Release 10 the Proximity Indication procedure is defined in TS 36.331 [3] and is used to indicate that the UE is entering or leaving the proximity of one or more CSG member cells. The detection of proximity is based on an autonomous search function as defined in TS 36.304 [4], where the search function itself is left to UE implementation.

The Proximity Indication functionality could be extended for MRN use, e.g. to indicate the MRN is entering or leaving the proximity of a DeNB.

Figure 19:
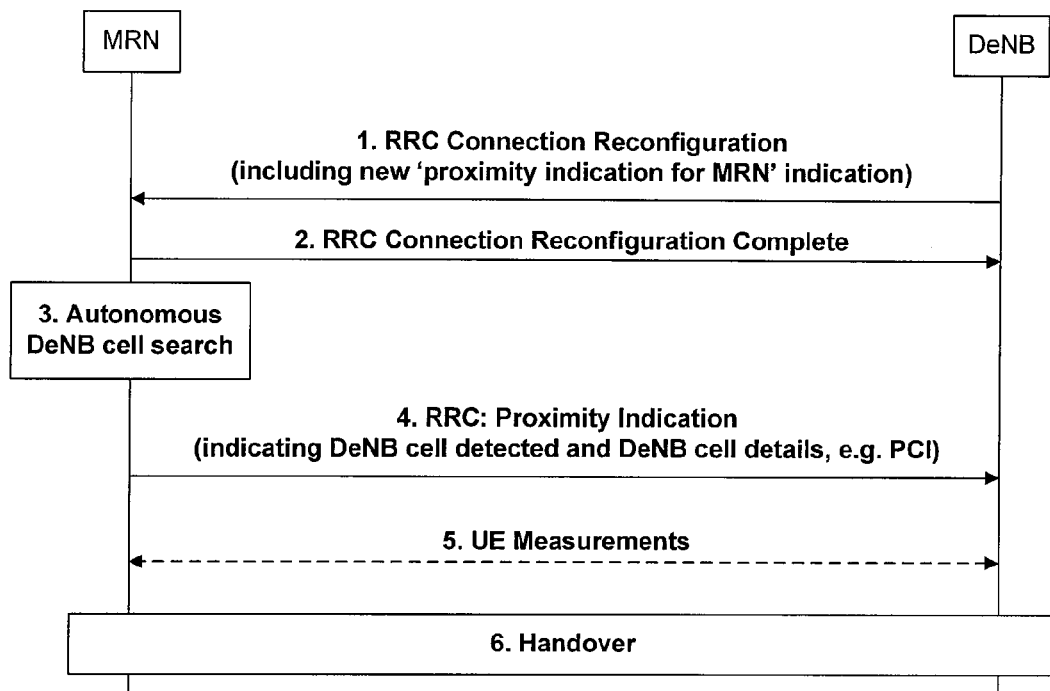
FIG. 19 shows possible proximity indication procedure for MRN.

An example is shown in the following figure:

Note: dotted lines in the figure represent optional parts of the procedure. See FIG. 19.

1. The DeNB performs the RRC Connection Reconfiguration procedures as part of RN start-up/RN handover as existing. The RRC Connection Reconfiguration message contains a new IE to indicate proximity indication for MRN is required, e.g. 'proximityIndicationEUTRA-RN'
2. MRN replies with the RRC Connection Reconfiguration Complete message as existing
3. MRN would then perform an autonomous search for DeNB cells. This search can be limited to only the allowed DeNB cells as downloaded from O&M. The actual mechanism of the search could be left to implementation as existing, but may include the following options:
   a. Location based
   b. Measurement based
4. MRN send the RRC: Proximity Indication message. The RRC: Proximity Indication message contains new IEs to indicate suitable DeNB cell(s) have been detected and also the identity of the DeNB cell(s), e.g. PCI(s)
5. DeNB may then wish to carry out further UE measurements, e.g. to decide when to trigger the handover and to determine the target cell. This step is optional as the DeNB could trigger handover based on proximity indication alone.
6. DeNB then performs handover as existing Solution 5: DeNB Uses Pre-Determined Route Information to Trigger Handover Method 5.1: DeNB Uses Location Services and Pre-Determined Route Information to Trigger Handover In this method only location calculation is required. Fewer measurements are performed so less handover delay.

Train-mounted MRNs use a known route, therefore the locations and target DeNB cells of handovers can be pre-determined.

The DeNB will need to know MRN location, e.g. using the Location Request services of LCS [2], and compare this to the pre-determined handover information to decide when handover is required, and towards which cell.

In 3GPP Release 10 the DeNB is not currently specified to have access to any pre-determined MRN handover information. Pre-determined MRN handover information (such as geographic coordinates, next allowed MRN cell) should be available to the DeNB, e.g. by download from O&M when it is serving a MRN.

Figure 20:
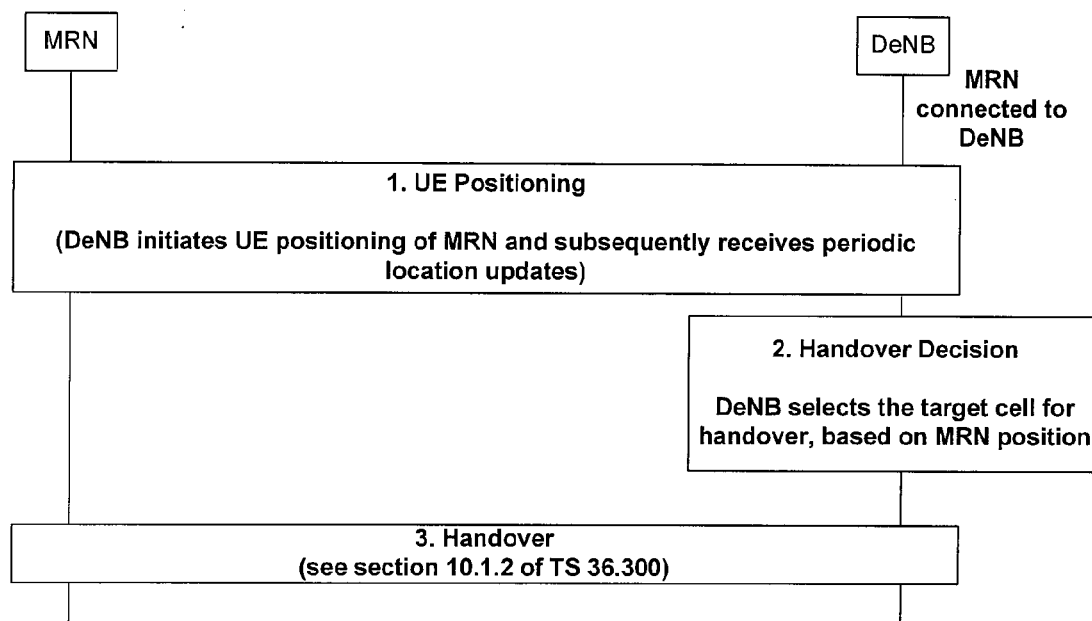
FIG. 20 shows Method 5.1: Message sequence for HO triggering, including measurements.

Since the existing allowed DeNB cell list can be RN specific (in Rel' 10 it is downloaded from RN O&M), the DeNB must either:

Have access to RN specific O&M, or
RN specific information must be available in DeNB O&M, or
Allowed DeNB cell lists are not allowed to be RN specific See FIG. 20.

Method 5.2: DeNB Uses Existing Serving Cell Measurements and Pre-Determined Route Information to Trigger Handover In this solution only the serving DeNB cell is measured. This is easier to measure than neighbour cells and therefore less prone to error and delay.

Train-mounted MRNs use a known route therefore the next target DeNB cell can be pre-determined.

The DeNB can initiate the mobility procedure by requesting the MRN to trigger a measurement event when the serving cell drops below a threshold, i.e. using existing Measurement Event A2.

When the event, e.g. Measurement Event A2, is triggered the DeNB then uses the pre-determined route information to select the next target DeNB cell. The DeNB does not currently have this information. It may be downloaded from O&M by the DeNB when it is serving a MRN.

Note: Since this information may be RN specific (i.e. different RNs may be on different train routes), the DeNB must either have access to RN specific O&M or the equivalent information must be available in DeNB O&M.

The way the DeNB selects the next target DeNB cell depends upon the information it has available about the MRN movement:

Serving DeNB cell identifier and previous serving DeNB cell history
The DeNB cell history would enable the Serving DeNB to compare against the pre-determined order of DeNB cells to determine the next DeNB cell. UE History Information IE is already mandatory within the S1/X2 handover preparation procedures.

Figure 21:
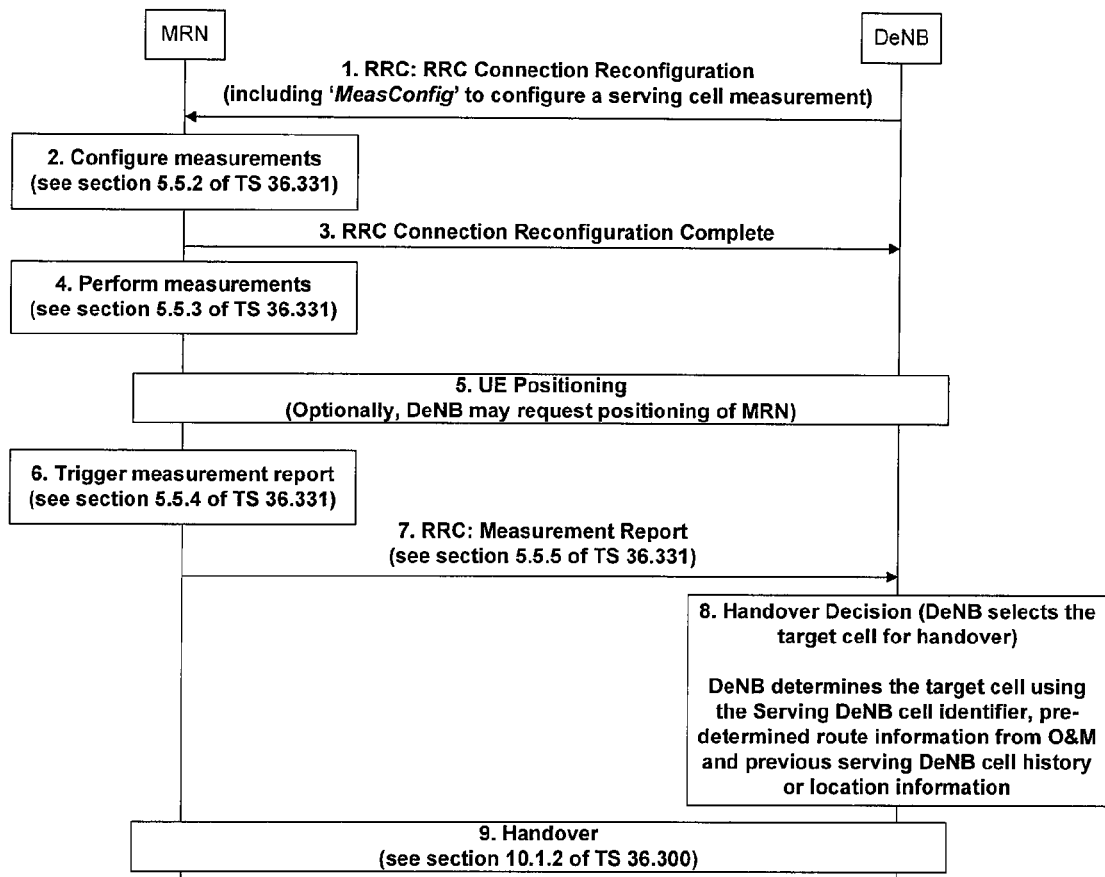
FIG. 21 shows Method 5.2: Message sequence for HO triggering, including measurements.

Serving DeNB cell identifier and location information
The location information provided to the DeNB could be full location positioning of the MRN or just some indication of MRN position, e.g. direction of travel. This information is not currently available to the DeNB. This would need to be added, e.g. as part of the Measurement Event A2 report or as a new measurement event The Serving DeNB can then compare against the pre-determined DeNB cell information (with location info) to determine the next DeNB cell. See FIG. 21.

Note: All above solutions consider the allowed DeNB cell list to be provided via O&M.

The same handling also applies if the allowed DeNB cell information is provided via other means, e.g. system information.

REFERENCES

[1] RP-111377, New Study Item Proposal: Mobile Relay for E-UTRA, 3GPP TSG RAN#53, Fukuoka, Japan, Sep. 13-16, 2011
[2] 3GPP TS 23.271 (V10.2.0), Functional stage 2 description of Location Services (LCS)
[3] 3GPP TS 36.331 (V10.6.0), E-UTRA; Radio Resource Control (RRC); Protocol specification
[4] 3GPP TS 36.304 (V11.0.0), E-UTRA; User Equipment (UE) procedures in idle mode
[5] 3GPP TS 36.300 (V10.8.0), E-UTRA and E-UTRAN; Overall description; Stage 2
[6] 3GPP TS 36.423, E-UTRAN (VI 1.1.0); X2 Application Protocol (X2AP)

A part of or the entirety of the embodiment described above can also be described as follows but are not limited thereto.

Accordingly one aspect of the present invention provides a base station for a communication system comprising a plurality of base stations and for initiating a handover of a mobile relay node currently served by said base station, the base station comprising: means for associating a serving cell of the base station with said mobile relay node for providing the mobile relay node with access to the communication system; means for obtaining information that: identifies at least one further base station; and that indicates that said at least one further base station is capable of providing donor services to said mobile relay node via at least one cell operated by said at least one further base station; means for determining when said mobile relay node requires handover to a different cell than the serving cell; means for selecting, from the at least one cell of the at least one further base station identified by said obtained information, a target cell for said handover of said mobile relay node; and means for performing handover of the mobile relay node to the selected target cell.

The obtained information may comprise a list of base stations capable of providing donor services (e.g. a list such as 'whitelist' or a donor base station 'whitelist'). Furthermore, the obtained information may comprise information relating to a pre-determined route of the mobile relay node.

The information relating to a pre-determined route of the mobile relay node may comprise at least one of geographical information representing said route, a list of donor capable cells/base stations along said route, and information identifying the next donor capable cell/base station along said route.

The information relating to a pre-determined route may be dependent on the location of the serving cell. Furthermore, the information relating to a pre-determined route may identify the next donor capable cell/base station along said route relative to the location of said serving cell.

The obtaining means may be operable to obtain said information from an operation and maintenance entity ('OAM'). Furthermore, the obtaining means may be operable to obtain at least part of said information from a further base station. Also, the obtaining means may be operable to use at least one X2 protocol message.

The at least one X2 protocol message may comprise at least one of an 'X2 SETUP REQUEST', an 'X2 SETUP RESPONSE', and an 'ENB CONFIGURATION UPDATE' message. Furthermore, the at least one X2 protocol message may comprise an indicator (e.g. an 'MRN Handover Allowed' information element) identifying each cell of the particular base station in which the mobile relay node can operate.

The information may comprise an identification of at least one base station and/or at least one cell to which the mobile relay node is able to hand over from the serving cell.

The obtaining means may be operable to obtain said information from the mobile relay node. Furthermore, the obtaining means may be operable to obtain said information from the mobile relay node in at least one RRC protocol message.

The at least one RRC protocol message may comprise at least one of a 'Measurement Report', an 'RN Handover Required', and a 'Proximity Indication' message. Furthermore, the at least one RRC protocol message may comprise at least one information element comprising an identification (e.g. physical cell identifier 'PCI') of at least one cell of a base station to which the mobile relay node can hand over.

The base station may further comprise means for configuring the mobile relay node to perform procedures in relation to the selection of the target cell.

The mobile relay node configuring means may be operable to configure measurement of at least one cell.

The at least one cell may comprise the serving cell and/or at least one neighbouring cell.

The mobile relay node configuring means may be operable to configure a search for donor capable cells.

The base station may further comprise means for configuring a positioning process to be performed by the base station in relation to the selection of the target cell.

The positioning process configuring means may be operable to configure said positioning process to obtain a current geographical location of the mobile relay node.

The mobile relay node configuring means may be operable to configure the mobile relay node to perform at least one of a location based measurement (e.g. 'Position Measurement') event, a serving cell based measurement (e.g. 'Serving Cell Measurement') event, and a proximity indication event (e.g. 'DeNB Cell Search').

The mobile relay node configuring means may be operable to perform said configuring using at least one RRC protocol message.

The at least one RRC protocol message may comprise a connection reconfiguration message (e.g. an RRC Connection Reconfiguration message). Furthermore, the at least one RRC protocol message may comprise an information element. The information element may comprise at least one of a 'MeasConfig' and a 'Proximity Indication' (e.g. 'proximityIndicationEUTRA-RN') information element.

Another aspect of the present invention provides a mobile relay node for a communication system comprising a plurality of base stations and for providing information for handover target cell selection by a current base station serving the mobile relay node, the mobile relay node comprising: means for associating with a serving cell of the current base station operating as a donor base station; means for obtaining information that: identifies at least one further base station; and that indicates that said at least one further base station is capable of providing donor services to said relay node via at least one cell operated by said at least one further base station; means for configuring and performing measurements of communication characteristics of at least one cell having a coverage area in which said mobile relay node is located; and means for reporting, to said current base station, at least one measurement report comprising results of said measurements; wherein said mobile relay node is operable: to provide, in said at least one measurement report, results of measurements in relation to at least one cell of the at least one further base station identified by said obtained information; and not to provide, in said at least one measurement report, results of measurements in relation to a cell having a coverage area in which said mobile relay node is located but which is not operated by the at least one further base station identified by said obtained information.

The means for configuring and performing measurements may be operable: to perform measurements in relation to at least one cell of the at least one further base station identified by said obtained information; and not to perform measurements in relation to a cell having a coverage area in which said mobile relay node is located but which is not operated by the at least one further base station identified by said obtained information; and said means for reporting may be operable to report said measurements in relation to at least one cell of the at least one further base station identified by said obtained information accordingly.

The means for configuring and performing measurements may be operable to perform measurements in relation to a particular cell regardless as to whether or not that cell is operated by the at least one further base station identified by said obtained information; and the means for reporting may be operable: to report measurements performed in relation to at least one cell of the at least one further base station identified by said obtained information; and not to report measurements performed in relation to a cell having a coverage area in which said mobile relay node is located but which is not operated by the at least one further base station identified by said obtained information.

The obtained information may comprise a list of base stations capable of providing donor services (e.g. a list such as 'whitelist' or a donor base station 'whitelist'). Furthermore, the obtained information may comprise information relating to a pre-determined route of the mobile relay node.

The information relating to a pre-determined route of the mobile relay node may comprise at least one of geographical information representing said route, a list of donor capable cells/base stations along said route, information, and information identifying the next donor capable cell/base station along said route. Also, the information relating to a pre-determined route may be dependent on the location of the serving cell. Furthermore, the information relating to a pre-determined route may identify the next donor capable cell/base station along said route relative to the location of said serving cell.

The obtaining means may be operable to obtain said information from an operation and maintenance entity ('OAM').

The information may comprise an identification of at least one base station and/or at least one cell to which the mobile relay node is able to hand over from the serving cell.

The obtaining means may be operable to obtain said information from the current base station. Furthermore, the obtaining means may be operable to obtain said information from said current base station in at least one RRC protocol message.

The at least one RRC protocol message may comprise at least one of a 'Measurement Report', an 'RN Handover Required', and a 'Proximity Indication' message. Furthermore, the at least one RRC protocol message may comprise at least one information element comprising an identification (e.g. physical cell identifier 'PCI') of at least one cell of a base station to which the mobile relay node can hand over.

The configuring and performing means may be operable to configure and perform measurements relating to at least one cell comprising the serving cell and/or at least one neighbouring cell.

The obtaining means may be operable to perform a search for donor capable cells whereby to obtain said information that: identifies at least one further base station; and that indicates that said at least one further base station is capable of providing donor services to said relay node via at least one cell operated by said at least one further base station.

The configuring and performing means may be operable to configure and perform at least one of a location based measurement (e.g. 'Position Measurement') event, a serving cell based measurement (e.g. 'Serving Cell Measurement') event, and a procedure related to a proximity indication event (e.g. 'DeNB Cell Search'). Furthermore, the configuring and performing means may be operable to receive at least one RRC protocol message from said current base station.

The at least one RRC protocol message may comprise a connection reconfiguration message (e.g. an RRC Connection Reconfiguration message). Furthermore, the at least one RRC protocol message may comprise an information element.

The information element may comprise at least one of a 'MeasConfig' and a 'Proximity Indication' (e.g. 'proximityIndicationEUTRA-RN') information element.

The transferring means may be operable to transfer said information relating to at least one cell of at least one identified further base station in at least one RRC protocol message.

The at least one RRC protocol message may comprise at least one of a 'Measurement Report', an 'RN Handover Required', and a 'Proximity Indication' message. Furthermore, the at least one RRC protocol message may comprise at least one information element comprising an identification (e.g. physical cell identifier 'PCI') of said at least one cell of at least one identified further base station.

Another aspect of the present invention provides a system comprising a base station as described above and a mobile relay node as described above.

Another aspect of the present invention provides a method performed by a base station, in a communication system comprising a plurality of base stations, for initiating a handover of a relay node currently served by said base station, the method comprising: associating a serving cell of the base station with said mobile relay node for providing the mobile relay node with access to the communication system; obtaining information that: identifies at least one further base station; and that indicates that said at least one further base station is capable of providing donor services to said mobile relay node via at least one cell operated by said at least one further base station; determining when said mobile relay node requires handover to a different cell than the serving cell; selecting, from the at least one cell of the at least one further base station identified by said obtained information, a target cell for said handover of said mobile relay node; and performing handover of the mobile relay node to the selected target cell.

Another aspect of the present invention provides a method performed by a mobile relay node, in a communication system comprising a plurality of base stations, for providing information for handover target cell selection by a current base station serving the mobile relay node, the method comprising: associating with a serving cell of the current base station operating as a donor base station; obtaining information that: identifies at least one further base station; and that indicates that said at least one further base station is capable of providing donor services to said relay node via at least one cell operated by said at least one further base station; configuring and performing measurements of communication characteristics of at least one cell having a coverage area in which said mobile relay node is located; and reporting, to said current base station, at least one measurement report comprising results of said measurements; wherein in said reporting step said mobile relay: provides, in said at least one measurement report, results of measurements in relation to at least one cell of the at least one further base station identified by said obtained information; and does not provide, in said at least one measurement report, results of measurements in relation to a cell having a coverage area in which said mobile relay node is located but which is not operated by the at least one further base station identified by said obtained information.

Another aspect of the present invention provides a computer program product comprising computer implementable instructions for causing a programmable computer device to become configured as a base station as described above or as a mobile relay node as described above.

The invention also provides corresponding methods and computer software products that may be provided on a carrier signal or on a recording medium, such as a CD, DVD or the like.

This application is based upon and claims the benefit of priority from United Kingdom patent application No. 1212537.3, filed on Jul. 13, 2012, the disclosure of which is incorporated herein in its entirety by reference.

What is claimed is:

1. A base station for a communication system comprising a plurality of base stations and for initiating a handover of a mobile relay node currently served by said base station, the base station comprising:
  a memory for storing instructions and at least one processor configured to execute the instructions to:
    associate a serving cell of the base station with said mobile relay node for providing the mobile relay node with access to the communication system;
    obtain information that identifies at least one further base station that is deemed capable of providing donor services to said mobile relay node via at least one cell operated by said at least one further base station when a speed of travel of the mobile relay node is taken into account;
    send signalling to the mobile relay node to configure, based on the obtained information that identifies the at least one further base station that is deemed capable of providing donor services to said mobile relay node when the speed of travel of the mobile relay node is taken into account, said mobile relay node to carry out measurements of the at least one cell that is capable of providing donor services to said mobile relay node;
    receive from said relay node results of measurements of said at least one cell operated by said at least one further base station that is capable of providing donor services to said mobile relay node;

determine when said mobile relay node requires handover to a different cell than the serving cell;

select, from the at least one cell of the at least one further base station identified by said obtained information, a target cell for said handover of said mobile relay node; and perform handover of the mobile relay node to the selected target cell, wherein said selecting of the target cell is performed such that cells covering a relatively small geographic area are discarded for handover decision in favor of relatively large cells.

2. The base station according to claim 1 wherein the positioning module is further configured to use at least one X2 protocol message, and preferably, wherein said at least one X2 protocol message comprises at least one of: an 'X2 SETUP REQUEST'; an 'X2 SETUP RESPONSE'; an 'ENB CONFIGURATION UPDATE' message; and an indicator (e.g. an 'MRN Handover Allowed' information element) identifying each cell of the particular base station in which the mobile relay node can operate.

3. The base station according to claim 1, wherein the at least one processor is further configured to execute the instructions to send signaling to the mobile relay node to configure the mobile relay node to perform at least one of a search for donor capable cells; a measurement reporting based on a location based measurement event; measurement reporting based on a serving cell based measurement event; and a measurement reporting based on a proximity indication event.

4. The base station according to claim 3 wherein the signaling sent to the mobile relay node to configure said mobile relay node comprises at least one RRC protocol message.

5. The base station according to claim 4 wherein said at least one RRC protocol message comprises at least one of a 'MeasConfig' and a 'Proximity Indication' information element.

6. A system comprising the base station of claim 1 and the mobile relay node served by the base station.

7. A non-transitory computer readable medium comprising computer implementable instructions for causing a programmable computer device to implement the base station of claim 1 or claim 2.

8. A mobile relay node for a communication system comprising a plurality of base stations for providing information for handover target cell selection by a current base station serving the mobile relay node, the mobile relay node comprising:

a memory for storing instructions and at least one processor configured to execute the instructions to:

associate with a serving cell of the current base station operating as a donor base station;

receive signaling, from the current base station, that is based on information that identifies at least one further base station that is capable of providing donor services to said mobile relay node when a speed of travel of the mobile relay node is taken into account, to configure the mobile relay node to carry out measurements of at least one cell that is capable of providing donor services to the mobile relay node;

configure and perform measurements, based on the signaling received from the current base station, of communication characteristics of the at least one cell that is capable of providing donor services to the mobile relay node, and having a coverage area in which said mobile relay node is located; and report, to said current base station, at least one measurement report comprising results of said measurements, wherein said selecting of the target cell is performed such that cells covering a relatively small geographic area are discarded for handover decision in favor of relatively large cells.

9. The mobile relay node according to claim 8 wherein the signaling received from the current base station comprises at least one RRC protocol message.

10. The mobile relay node according to claim 9 wherein the at least one RRC protocol message comprises at least one of a 'MeasConfig' and a 'Proximity Indication' information element.

11. The mobile relay node according to claim 8, wherein the measurement results are reported using at least one of a 'Measurement Report', an 'RN Handover Required', and a 'Proximity Indication' message.

12. A method performed by a base station, in a communication system comprising a plurality of base stations, for initiating a handover of a relay node currently served by said base station, the method comprising:

associating a serving cell of the base station with said mobile relay node for providing the mobile relay node with access to the communication system;

obtaining information that identifies at least one further base station that is deemed capable of providing donor services to said mobile relay node via at least one cell operated by said at least one further base station when a speed of travel of the mobile relay node is taken into account;

sending signalling to the mobile relay node to configure, based on the obtained information that identifies the at least one further base station that is capable of providing donor services to said mobile relay node when the speed of travel of the mobile relay node is taken into account, said mobile relay node to carry out measurements of the at least one cell that is capable of providing donor services to said mobile relay node;

receiving from said relay node results of measurements of said at least one cell operated by said at least one further base station that is capable of providing donor services to said mobile relay node;

determining when said mobile relay node requires handover to a different cell than the serving cell;

selecting, from the at least one cell of the at least one further base station identified by said obtained information, a target cell for said handover of said mobile relay node; and performing handover of the mobile relay node to the selected target cell, wherein said selecting of the target cell is performed such that cells covering a relatively small geographic area are discarded for handover decision in favor of relatively large cells.

13. A method performed by a mobile relay node, in a communication system comprising a plurality of base stations, for providing information for handover target cell selection by a current base station serving the mobile relay node, the method comprising:

associating with a serving cell of the current base station operating as a donor base station;

receive signalling from the current base station, that is based on information that identifies at least one further base station that is capable of providing donor services to said mobile relay node, to configure the mobile relay node to carry out measurements of at least one cell that is capable of providing donor services to the mobile relay node when a speed of travel of the mobile relay node is taken into account;

configuring and performing, based on the signaling received from the base station, measurements of communication characteristics of the at least one cell that is capable of providing donor services to the mobile relay node, and having a coverage area in which said mobile relay node is located; and reporting, to said current base station, at least one measurement report comprising results of said measurements, wherein said selecting of the target cell is performed such that cells covering a relatively small geographic area are discarded for handover decision in favor of relatively large cells.

\* \* \* \* \*